United States Patent [19]
Kugai et al.

[11] Patent Number: 4,990,743
[45] Date of Patent: Feb. 5, 1991

[54] CONTROL METHOD FOR TRACING A WELD LINE IN A WELDING APPARATUS

[75] Inventors: Katsuya Kugai, Osaka; Hideyuki Yamamoto, Kobe; Yusuke Niimura, Osaka, all of Japan

[73] Assignee: Daihen Corporation, Osaka, Japan

[21] Appl. No.: 438,677

[22] Filed: Nov. 17, 1989

[30] Foreign Application Priority Data

May 10, 1989 [JP] Japan .................................. 64-118176

[51] Int. Cl.$^5$ ............................................. B23K 9/127
[52] U.S. Cl. ............................. 219/124.34; 219/125.12
[58] Field of Search ....................... 219/124.34, 125.12, 219/124.22

[56] References Cited

U.S. PATENT DOCUMENTS 4,417,126 11/1983 Kasahara et al. .
4,485,291 11/1984 Nomura et al. .

FOREIGN PATENT DOCUMENTS 57-160578 10/1982 Japan .
57-160579 10/1982 Japan .
60-223666 11/1985 Japan .
60-234774 11/1985 Japan .
62-230476 10/1987 Japan .

Primary Examiner—Clifford C. Shaw
Attorney, Agent, or Firm—Scully, Scott, Murphy & Presser

[57] ABSTRACT

A control method in a welding apparatus for enabling a welding torch to trace a weld line with use of an oscillating process is disclosed. The welding torch is oscillated in left and right directions solidly crossing the weld line. Electric signals respectively detected when the welding torch moves in the left and right directions for a time interval of the right half of the oscillation are compared with each other so as to generate a first comparative signal, and electric signals detected similarly for a time interval of the left half thereof are compared with each other so as to generate a second comparative signal. The center of the oscillation is moved in such a direction that a difference between the first and second comparative signals becomes small.

12 Claims, 14 Drawing Sheets

$Rs = \Sigma Rr - \Sigma R\ell$ $Ls = \Sigma L\ell - \Sigma Lr$

CONTROL METHOD FOR TRACING A WELD LINE IN A WELDING APPARATUS

BACKGROUND OF THE INVENTION

1. Field of the Invention

The present invention relates to a control method for enabling a welding torch to trace a weld line while oscillating the welding torch by detecting an electric change responsive to changes in an arc length and a wire extension.

2. Description of Related Art

Conventionally, there has been widely used a control method for tracing a welding line according to a detection signal of an arc sensor for detecting an electric change responsive to changes in the arc length and the wire extension caused when the welding torch is oscillated.

The conventional arc sensor can yield relatively good results in the horizontal fillet welding provided that the welding speed is relatively low, for instance, of an order of 120 cms/min.. Also, in the horizontal fillet welding, the arc sensor is applicable to a thin plate of an order of 2 mms in thickness. In the conventional tracing method as mentioned above, the oscillation frequency of the welding torch is set at a relatively low frequency in the range from 0.5 to 5 Hz.

Referring to FIGS. 1 and 2, a relationship between each position of the oscillation of the welding torch and the welding current detected when the welding torch is oscillated at a relatively low frequency between left and right works Wl and Wr to be welded will be described below.

The portion (B) of FIG. 1 is a schematic front view of the welding torch WT and the left and right works Wl and Wr when the center C of the oscillation coincides with the weld line $W_0$. In the portion (B) of FIG. 1, $A_0$ and $A_1$ denote lengths (referred to as wire extensions hereinafter) of consumable electrodes projecting from the tip end WTa of the welding torch WT, and $B_0$ denotes a distance (referred to as an arc length hereinafter) defined between the end Wa of the consumable electrode (referred to as a wire hereinafter) W and respective surfaces of the works. The end Wa of the wire W is referred to as a wire end Wa hereinafter.

Referring to the portion (B) of FIG. 1, when the welding torch WT is located at a left edge $L_0$ of the amplitude of the oscillation, the wire extension is $A_1$ and the arc length is $B_0$. As the welding torch WT moves from the left edge $L_0$ to the center C of the oscillation corresponding to the weld line $W_0$ at a low oscillation frequency, the welding current increases according to the self-control action of a welding power source based on a regulated constant voltage characteristic, the melting speed of the wire increases, and thereby, the arc length becomes approximately constant $B_0$. Therefore, the wire extension increases gradually from the length $A_l$ to the length $A_0$.

As shown in the portion (A) of FIG. 1, when the wire extension increases, the average value I of the welding current which is represented by the axis of ordinate decreases from a current $I_1$ to a current $I_0$ according to a change in the position P of the oscillating welding torch WT which is represented by the axis of abscissa. On the other hand, when the welding torch WT moves from the center C of the oscillation to the right edge $R_0$ thereof, the wire extension decreases from the length $A_0$ to the length $A_1$ while keeping the arc length $B_0$ constant contrary to the aforementioned action, and the welding current increases from the current $I_0$ to the current $I_1$. Therefore, when the center C of the oscillation coincides with the weld line $W_0$, namely, when there is no shift between the center C of the oscillation and the weld line $W_0$, respective characteristics of the welding current detected on both sides of the weld line $W_0$ are symmetric, namely, the welding current detected when the welding torch WT moves in the left direction is the same as that detected when the welding torch WT moves in the right direction.

The portion (C) of FIG. 1 shows a relationship between the welding current I represented by the axis of ordinate and a passed time t represented by the axis of abscissa, and the portion (D) of FIG. 1 shows a relationship between the position P of the oscillating welding torch WT represented by the axis of ordinate and a passed time t represented by the axis of abscissa.

The portion (B) of FIG. 2 is a schematic front view of the welding torch WT and the left and right works Wl and Wr when the center C of the oscillation is shifted from the weld line $W_0$. As shown in the portion (B) of FIG. 2, as the welding torch WT is oscillated from the left edge $L_1$ of the amplitude of the oscillation through the center C thereof to the right edge $R_1$ thereof, after the wire extension increases from a length $A_3$ to a length $A_0$ corresponding to the weld line $W_0$ while keeping the arc length $B_0$ constant as well as the action shown in FIG. 1, the wire extension decreases from a length $A_0$ through a length $A_4$ corresponding to the center C of the oscillation to a length $A_5$. Therefore, when the center C of the oscillation is shifted from the weld line $W_0$, responsive characteristics of the welding current I detected on both sides of the weld line $W_0$ are asymmetric, namely, respective welding current detected when the welding torch WT moves in the left direction is the same as that detected when the welding torch WT moves in the right direction.

The portion (C) of FIG. 2 shows the relationship between the welding current I represented by the axis of ordinate and a passed time t represented by the axis of abscissa, and the portion (D) of FIG. 2 shows the relationship between the position P of the oscillating welding torch WT represented by the axis of ordinate and a passed time t represented by the axis of abscissa.

Next, the relationship between the average value Ia of the welding current and the distance D in the direction toward the wire end Wa between the tip end WTa of the welding torch WT and the surface of th works Wl and Wr will be described below with a well known experimental equation.

Generally, the melting speed Vm of the wire in the arc welding is represented by the following equation:

$$Vm = a_0 \cdot Ia + b_0 \cdot A \cdot (Ia)^2 \qquad (1)$$

wherein
  Ia is the average value of the welding current I,
  A is the wire extension, and
  $a_0$, $b_0$ and $c_0$ are constants, respectively.

Since the arc length $B_0$ is approximately constant at a low oscillation frequency, the melting speed Vm of the wire is assumed to be equal to a feeding speed Vf of the wire, resulting in the following equation.

$$Vm = Vf = g \qquad (2)$$

wherein g is a constant.

The following equation is obtained by combining the equations (1) and (2).

$$a_0 \cdot Ia + b_0 \cdot A \cdot (Ia)^2 = Vm = Vf = g \qquad (3)$$

The following equation is obtained by differentiating the equation (3) by a time t.

$$a_0 \cdot dIa + b_0\{(Ia)^2 \cdot dA + 2A \cdot Ia \cdot dIa\} = 0 \qquad (4)$$

On the other hand, the aforementioned distance D is represented by the following equation:

$$D = B_0 + A \qquad (5)$$

Since the arc length $B_0$ is smaller than the wire extension A and is approximately constant, $D \approx A$. Therefore, the following equation is obtained by substituting the distance D with the wire extension A in the equation (3).

$$\frac{dIa}{dD} = -\frac{b \cdot Ia^2}{a_0 + 2b_0 \cdot D \cdot Ia} \qquad (6)$$

Since there is no term depending on a time in the equation (6), the welding current Ia is determined by setting the distance D determined by the position P of the oscillating welding torch WT. Namely, the distance D measured when the welding torch WT moves in the right direction from the left edge of the amplitude of the oscillation to the right edge thereof is the same as the distance D measured when the welding torch WT moves in the left direction from the right edge of the amplitude of the oscillation to the left edge thereof, the characteristic of the welding current detected when the welding torch WT moves in the left direction is substantially same as that detected when the welding torch WT moves in the right direction, and the characteristic of the welding current detected when the welding torch WT is located in the left half of the amplitude of the oscillation is substantially same as that detected when the welding torch WT is located in the right half thereof. This implies that the action described above based on the equation (6) is similar to that described above referring to FIGS. 1 and 2.

In the conventional control process, the weld line $W_0$ is determined based on the action described above referring to FIGS. 1 and 2 or the equation (6) using either one of the following methods from (a) to (d).

(a) An integrated value of the welding current detected for the time interval of the right half of the amplitude of the oscillation is compared with an integrated value of the welding current detected for the time interval of the left half thereof so as to detect the weld line $W_0$.

(b) A peak value of the welding current detected when the welding torch WT is located at a specific position of the right half of the amplitude of the oscillation is compared with a peak value of the welding current detected when the welding torch WT is located at a specific position of the left half thereof so as to detect the weld line $W_0$.

(c) A position of the welding torch WT when a minimum welding current is detected during oscillating the welding torch WT is detected as the weld line $W_0$.

(d) The weld line $W_0$ is detected by using a method of a modification or a combination of the aforementioned methods (a) to (c).

Since a change in the melting speed of the wire follows a change in the position of the oscillating welding torch WT at a low oscillation frequency of 0.2 to 5 Hz in the conventional control process so as to keep the arc length $B_0$ approximately constant, the welding current follows a change in the wire extension A or a change in the distance D and varies under the condition of the characteristics shown in FIGS. 1 and 2 or the characteristic indicated by the equation (6). Therefore, the position P of the oscillating welding torch WT can be controlled satisfactorily with use of one of the aforementioned control methods (a) to (c) so as to trace the weld line $W_0$.

The aforementioned control method can be used even in a horizontal fillet welding for welding thin plates having a thickness of about 2.0 mms. However, in order to weld thin plates having a thickness of about 1.6 mms, it becomes necessary to increase the welding speed, namely, to heighten the oscillation frequency. For example, when the oscillation frequency is set so as to fall within the range from 0.2 to 5 Hz in such a case, the welding bead may be form thereon with meandering because of the low oscillation of the welding torch WT. In order to prevent the welding bead from being formed thereon with meandering, it is necessary to set an oscillation frequency equal to or higher than 5 Hz. When the oscillation frequency becomes about 5 Hz, the melting of the wire at the melting speed Vm corresponding to a change in the distance $A+B$ defined between the tip end WTa of the welding torch WT and the surface of the works W1 and Wr, can not follow a change in the position P of the oscillating welding torch WT since the position P thereof varies rapidly. Therefore, the arc length B varies, resulting in that the real change in the welding current can not reflect the characteristics shown in FIGS. 1 and 2 or the characteristic represented by the equation (6).

Namely, in the case of no shift between the center C of the oscillation and the weld line $W_0$, when the welding torch WT moves from the left edge $L_0$ of the oscillation to the right edge $R_0$ thereof, the wire end Wa draws a locus of a curve as shown in the portion (B) of FIG. 3. The reason why the wire end Wa draws this locus is as follows. At an oscillation frequency of about 5 Hz, when the aforementioned distance $A+B$ increases gradually, the decrease in the melting speed Vm of the wire can not follow a change in the distance $A+B$ due to a change in the position P of the oscillating welding torch WT, resulting in that the arc length B can not be kept constant. Therefore, as shown in the portion (B) of FIG. 3, after the arc length increases from a length $B_0$ to a length $B_2$, the welding torch WT passes through the center C of the oscillation, and then, the arc length decreases down to a length $B_3$. Thereafter, the arc length increases up to a length $B_0$. Responsive to the above change in the arc length, the welding current decreases from a current $I_5$, and when the welding torch WT passes through the center C of the oscillation, the welding current becomes a current $I_6$. Furthermore, the welding current decreases down to a current $I_7$, and thereafter, the welding current increases up to a current $I_5$ detected when the welding torch WT is located at the right edge of the oscillation.

Thereafter, when the center C of the oscillation is shifted from the weld line $W_0$, the wire end Wa draws a locus of a curve as shown in the portion (B) of FIG. 4 when the welding torch WT is oscillated. According to the above change in the position of the wire end Wa, the welding current draws a locus of a curve as shown in the portion (A) of FIG. 4.

Thus, when the oscillation frequency reaches about 5 Hz, a substantial change reflecting to the shift amount between the center C of the oscillation and the weld line $W_0$ can not be obtained in the conventional method for comparing an integrated value, a peak value, or a minimum value for one period of the welding current detected for the time interval of the right half of the amplitude of the oscillation, with that detected for the time interval of the left half thereof, resulting in that it has been difficult to put the welding apparatus utilizing the above control method in practical use.

In order to solve the above problems, there have been proposed two following methods. One is a method for detecting a weld line $W_0$ by comparing a difference between a minimum value of a welding current detected when the welding torch WT moves in the right direction and a welding current detected when the welding torch WT is located at the right edge of the oscillation, with a difference between a minimum value of a welding current detected when the welding torch WT moves in the left direction and a welding current detected when the welding torch WT is located at the left edge of the oscillation. Another is a method for detecting a weld line $W_0$ by comparing an integrated value of the welding current detected for the time intervals of the left and right halves when the welding torch WT moves in the right direction, with an integrated value of welding current detected for the time intervals of the left and right halves when the welding torch WT moves in the left direction.

These improved methods can be applied to the case at a low oscillation frequency of about 5 Hz. However, at an oscillation frequency higher than about 5 Hz, as described later, the locus of the welding current to the position P of the oscillating welding torch WT further changes therefrom. Therefore, the difference between the detected values becomes small, resulting in that it is difficult to detect the weld line $W_0$ precisely.

When the characteristics of the action shown in FIGS. 1 or 2 or represented by the equation (6) are applied to the conventional control method for tracing the weld line $W_0$ at a low oscillation frequency of 0.5 to 5 Hz, it is assumed that the arc length $B_0$ is kept constant independent of the position P of the oscillating welding torch WT. Therefore, if the characteristic of the position P of the oscillating welding torch WT or the distance D in the direction toward the wire end Wa defined between the tip end WTa of the welding torch WT and the surface of the works Wl and Wr when the welding torch WT moves in the right direction is substantially same as that when the welding torch WT moves in the left direction, the aforementioned conventional control method can be used only under the condition that the characteristic of the welding current detected when the welding torch WT moves in the right direction is substantially same as that when the welding torch WT moves in the left direction.

Therefore, in the conventional control method, the welding speed is limited to about 120 cms/min. at the most in the case of a horizontal fillet welding, and the welding speed is limited to about 80 cms/min. at the most in the case of a lap fillet welding. The minimum thickness of plates which can be welded is limited to 2.0 mms in the case of the horizontal fillet welding, and it is limited to 3.2 mms in the case of the lap fillet welding.

Furthermore, in the case of a vertical down welding utilizing the conventional control method, since a speed at which the melting metal drops is higher than the welding speed, it is difficult to put the vertical down welding in practical use. The same control method can not be applied to both a spray arc welding and a short arc welding, namely, separate control methods must be applied to them, respectively. Therefore, a use of each of the conventional control methods is limited. Due to this, the conventional control methods can not meet the latest needs of the automation in a welding at a high oscillation frequency and in a vertical welding for welding thin plates for forming respective portions of an automobile.

SUMMARY OF THE INVENTION

An essential object of the present invention is to provide a control method for enabling a welding torch to trace a weld line while oscillating the welding torch in a welding apparatus, which is capable of performing an oscillating process at an oscillation frequency higher than the highest oscillation frequency at which a conventional oscillating process can be performed.

Another object of the present invention is to provide a control method for enabling a welding torch to trace a weld line more precisely with use of an oscillating process in a welding apparatus, than a conventional oscillating process.

A further object of the present invention is to provide a control method for enabling a welding torch to trace a weld line in a welding apparatus, which is applicable to various kinds of welding methods such as a vertical down welding.

A still further object of the present invention is to provide a control method for enabling a welding torch to trace a weld line in a welding apparatus, which is capable of performing an oscillating process precisely even in the case of a small welding current.

In order to accomplish the above objects, according to one aspect of the present invention, there is provided a control method in a welding apparatus for enabling a welding torch to trace a weld line while oscillating said welding torch in left and right directions solidly crossing said weld line by detecting a change in an electric signal responsive to changes in an arc length and a wire extension, comprising steps of:

detecting said electric signal as a first detecting signal when said welding torch moves in the right direction for a first time interval of the right half of the amplitude of the oscillation;

detecting said electric signal as a second detecting signal when said welding torch moves in the left direction for the first time interval;

generating a first comparative signal by comparing the first detecting signal with the second detecting signal;

detecting said electric signal as a third detecting signal when said welding torch moves in the left direction for a second time interval of the left half of the amplitude of the oscillation;

detecting said electric signal as a fourth detecting signal when said welding torch moves in the right direction for the second time interval;

generating a second comparative signal by comparing the third detecting signal with the fourth detecting signal;

calculating a difference between respective levels of the first and second comparative signals; and moving the center of the oscillation in such a direction that the calculated difference becomes small so as to enable said welding torch to trace said weld line.

The calculated difference used for determining the direction in which the center of the oscillation is to be moved is set so that the sign of the calculated difference at an oscillation frequency lower than a predetermined frequency is different from the sign of the calculated difference at the oscillation frequency equal to or higher than the predetermined frequency.

According to another aspect of the present invention, there is provided a control method in a welding apparatus for enabling a welding torch to trace a weld line while oscillating said welding torch in left and right directions solidly crossing said weld line by detecting a change in an electric signal responsive to changes in an arc length and a wire extension, comprising steps of:

detecting said electric signal as a first detecting signal when said welding torch is located at the right edge of the oscillation after said welding torch moves in the right direction;

detecting said electric signal as a second detecting signal when said welding torch is located at the center of the oscillation while said welding torch moves in the left direction;

generating a first comparative signal by comparing the first detecting signal with the second detecting signal;

detecting said electric signal as a third detecting signal when said welding torch is located at the left edge of the oscillation after said welding torch moves in the left direction;

detecting said electric signal as a fourth detecting signal when said welding torch is located at the center of the oscillation while said welding torch moves in the right direction;

generating a second comparative signal by comparing the third detecting signal with the fourth detecting signal;

calculating a difference between respective levels of the first and second comparative signals; and moving the center of the oscillation in such a direction that the calculated difference becomes small so as to enable said welding torch to trace said weld line.

BRIEF DESCRIPTION OF THE DRAWINGS

These and other objects and features of the present invention will become clear from the following description taken in conjunction with the preferred embodiments thereof with reference to the accompanying drawings, in which:

FIGS. 5a to 5c, 6a to 6c, 7a to 7c and 8a to 8c are graphs showing the relation between the position of the oscillating welding torch and the welding current which is obtained from a differential equation which a change in the arc length and an inductance of a power source for welding are taken into consideration in order to examine a control process of the present preferred embodiments according to the present invention, wherein FIGS. 5a to 5c show the relations therebetween at an extremely low oscillation frequency of 0.2 to 2 Hz, FIGS. 6a to 6c show the relations therebetween at a low oscillation frequency of 2 to 5 Hz, FIGS. 7a to 7c show the relations therebetween at a middle oscillation frequency of 5 to 7 Hz, FIGS. 8a to 8c show the relations therebetween at a high oscillation frequency of 7 to 10 Hz, FIGS. 5a, 6a, 7a and 8a show the relations therebetween when the center of the oscillation is shifted onto the left side of the weld line, FIGS. 5b, 6b, 7b and 8b show the relations therebetween when there is no shift between the center of the oscillation and weld line, and FIGS. 5c, 6c, 7c and 8c show the relations therebetween when the center of the oscillation is shifted onto the right side of the weld line;

Figure 1:
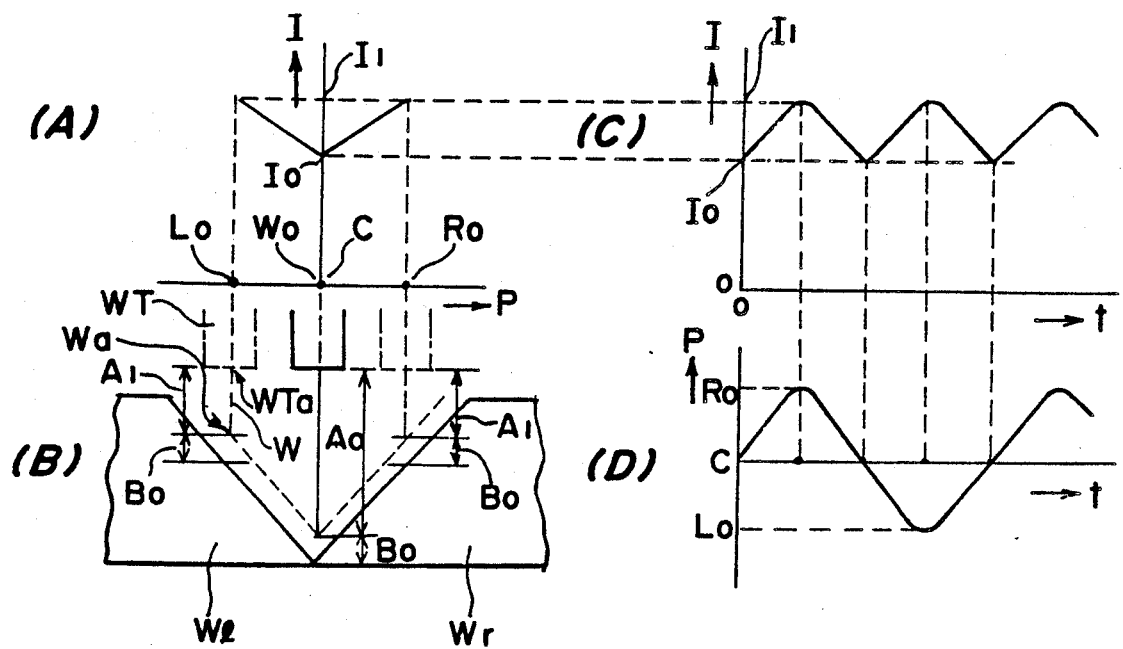
FIG. 1 is an explanative view showing a conventional control method for enabling an oscillating welding torch to trace a weld line in the case of no shift between the center of the oscillation and the weld line under the condition that an arc length is constant, wherein (A) of FIG. 1 is a graph showing the relation between a position of the oscillation and a detected welding current, (B) of FIG. 1 is a schematic front view of the welding torch and left and right works to be welded showing the relation among the wire end Wa corresponding to the position of the oscillating welding torch WT, wire extensions $A_1$ and $A_2$, and an arc length $B_0$, (C) of FIG. 1 is a graph showing the relation between the welding current and a passed time, and (D) of FIG. 1 is a graph showing the relation between the position P of the oscillating welding torch and a passed time.
Figure 2:
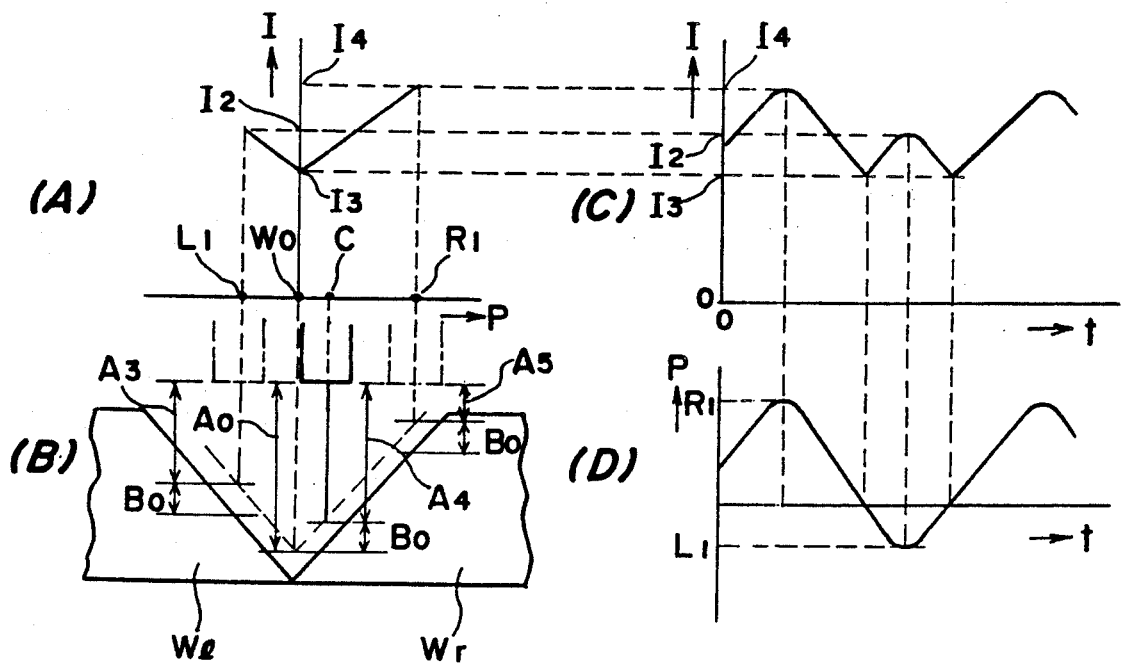
FIG. 2 is an explanative view showing a conventional control method for enabling an oscillating welding torch to trace a weld line in the case that the center of the oscillation is shifted from the weld line under the condition that an arc length is constant, wherein (A), (C) and (D) of FIG. 2 are graphs corresponding to that shown in (A), (C) and (D) of FIG. 1, respectively, and (B) of FIG. 2 is a schematic front view corresponding to that shown in (B) of FIG. 1.
Figure 9:
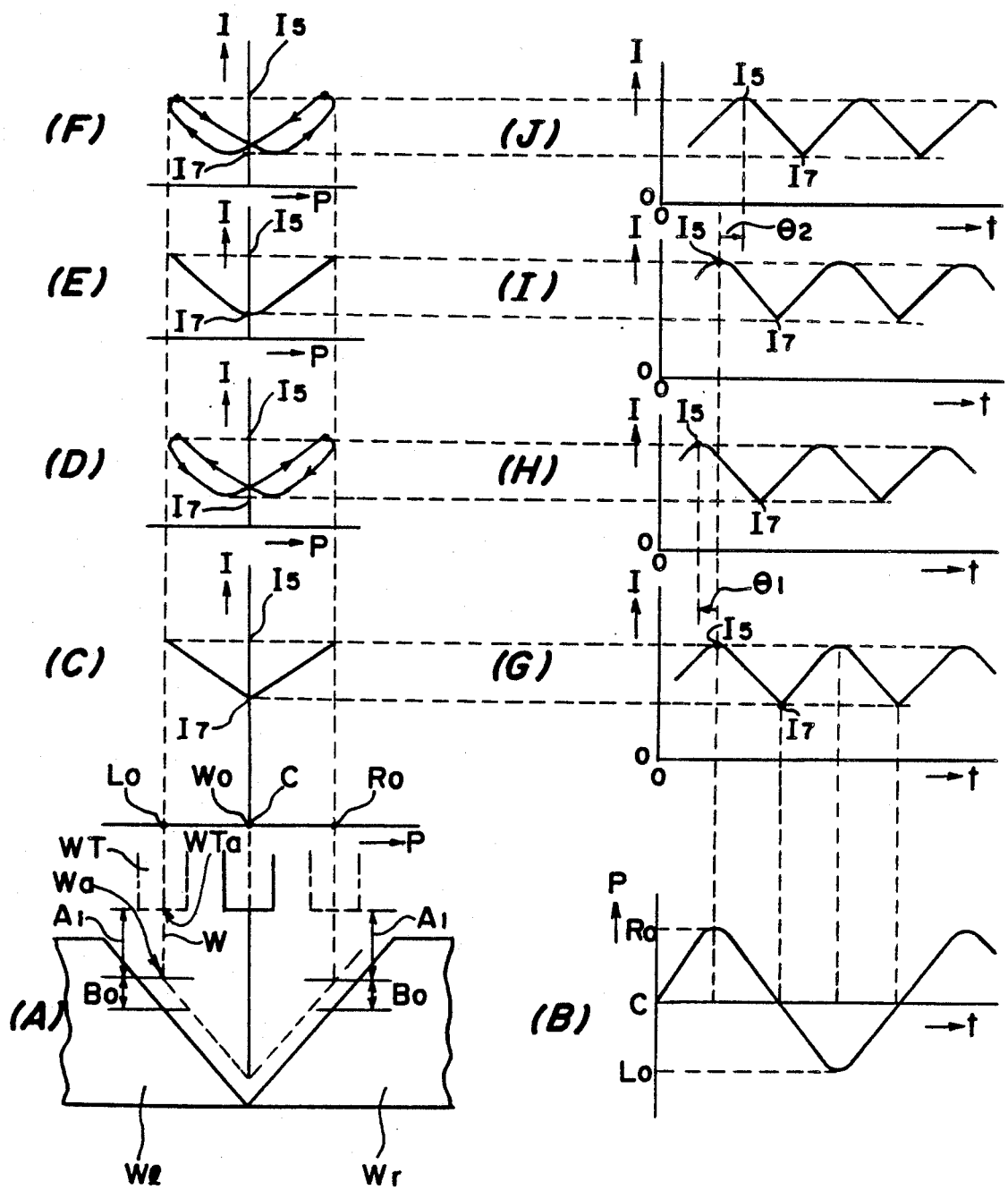
Figure 10:
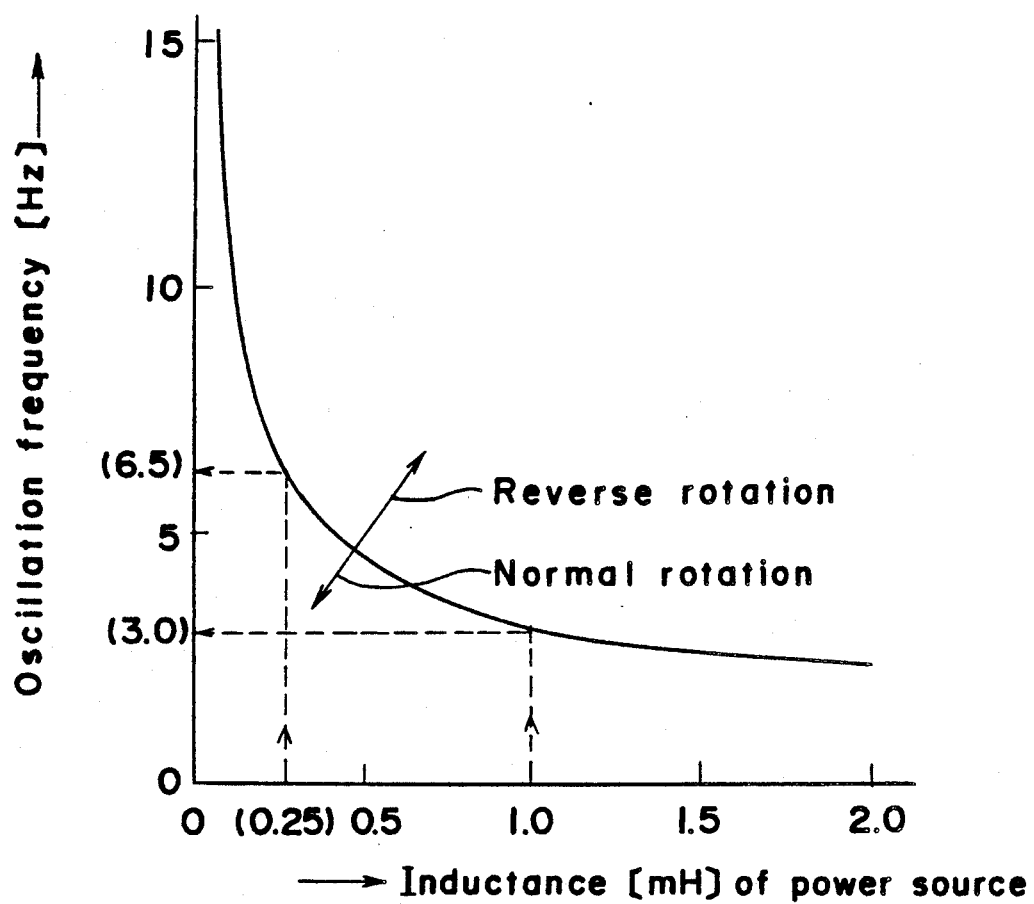
Figure 22:
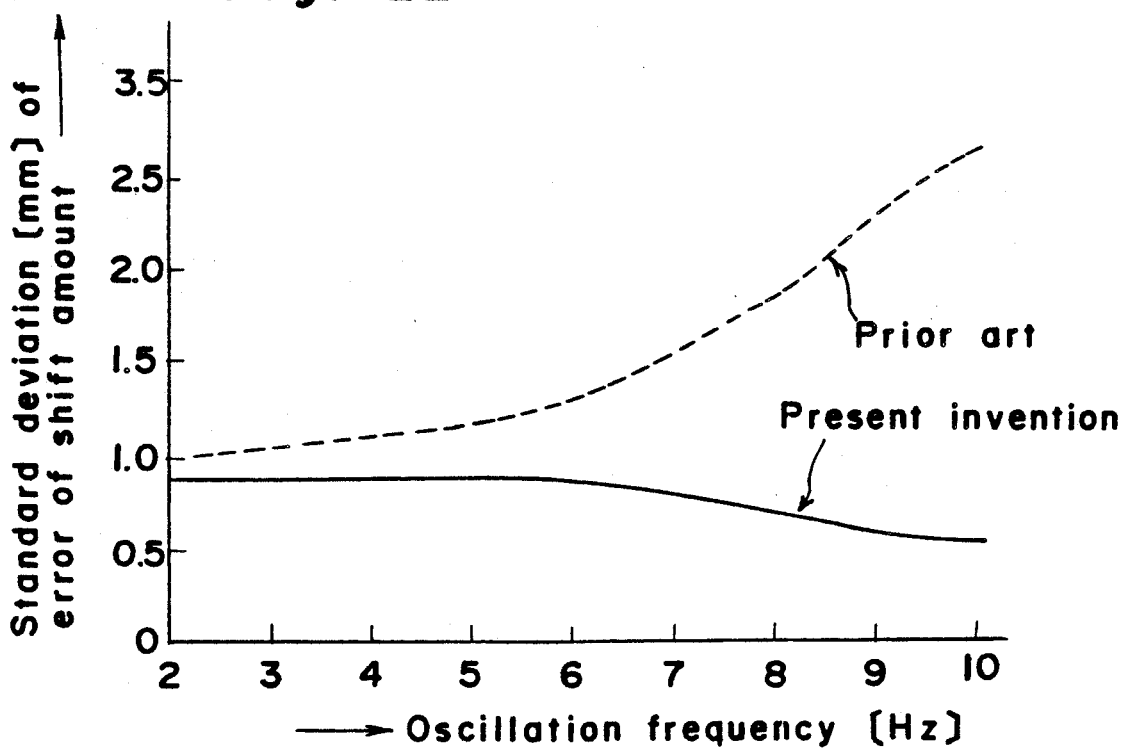
Figure 11:
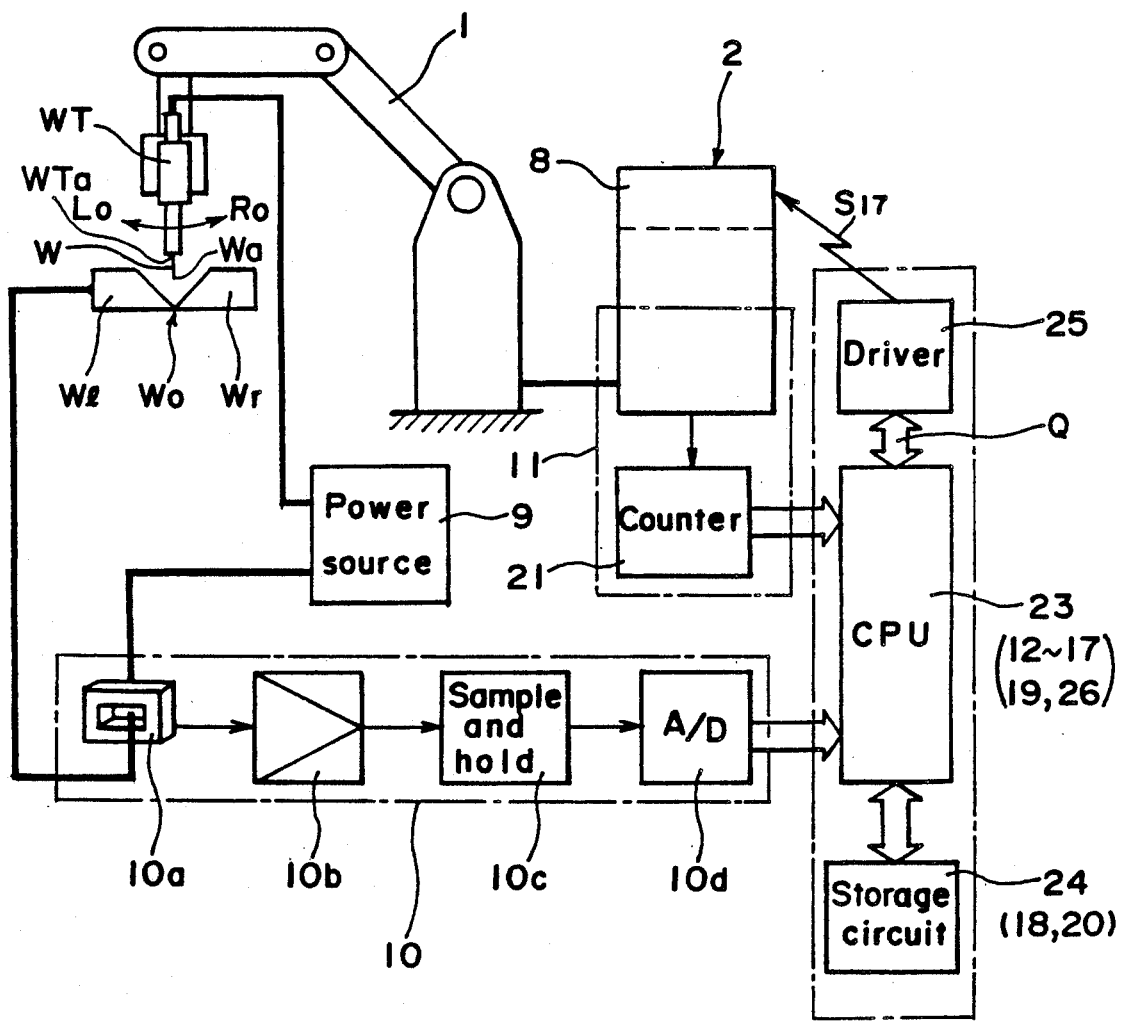
Figure 12A:
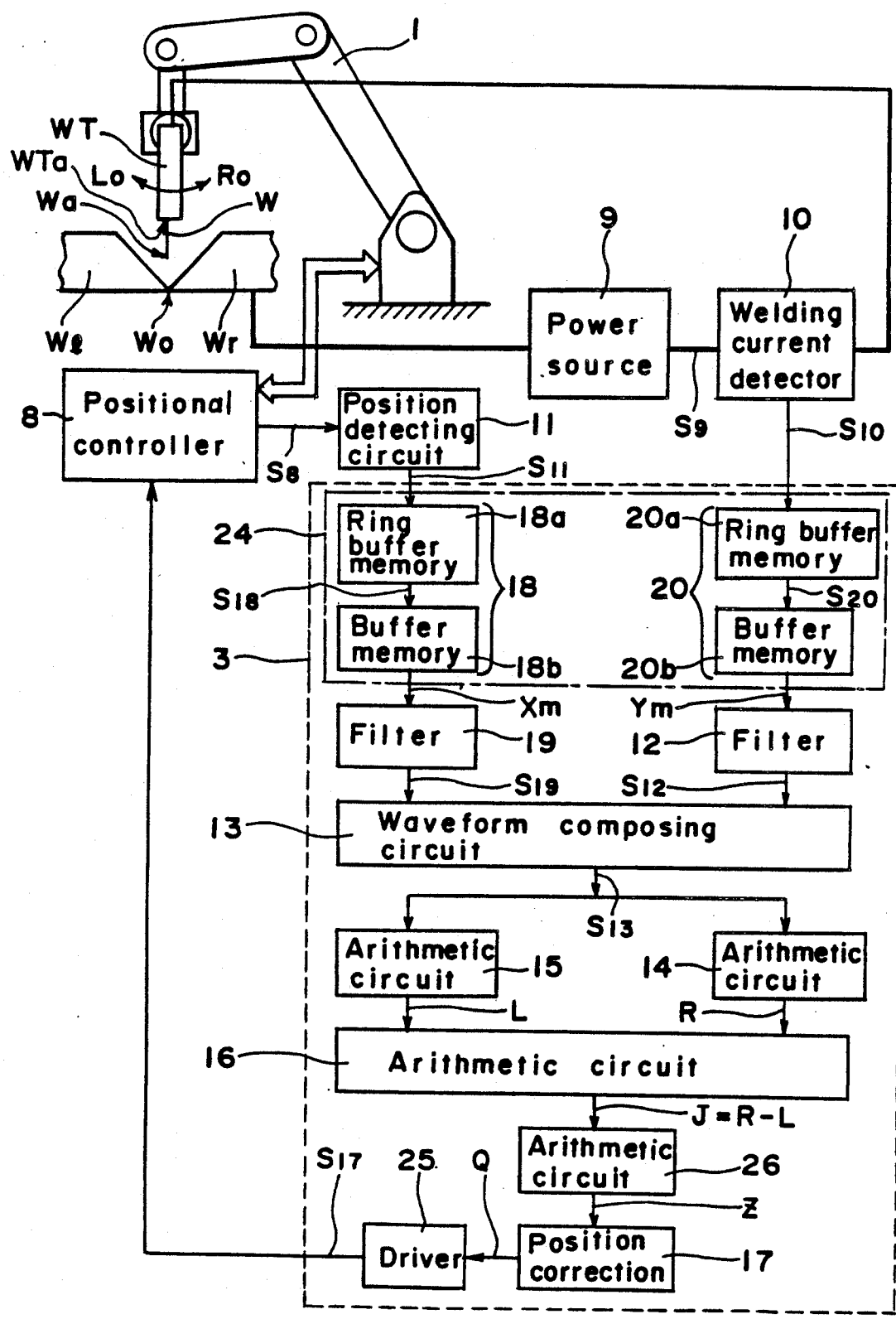
Figure 12B:
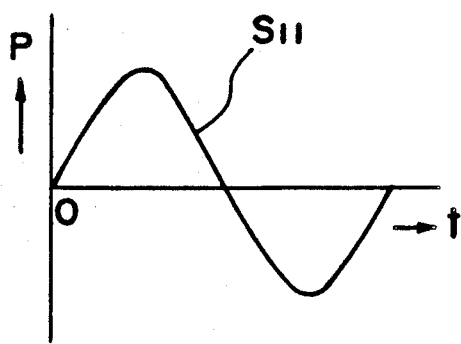
Figure 12C:
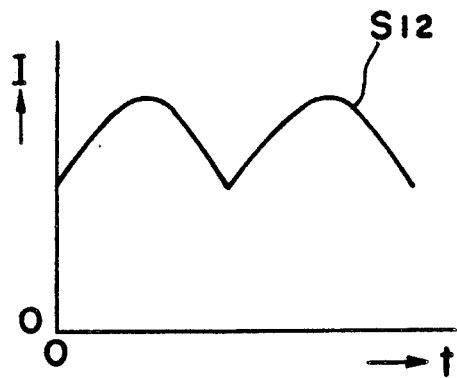
Figure 12D:
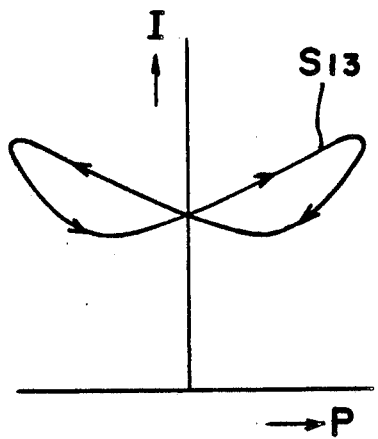
Figure 12E:
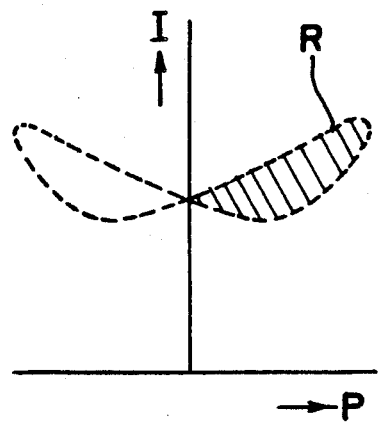
Figure 12F:
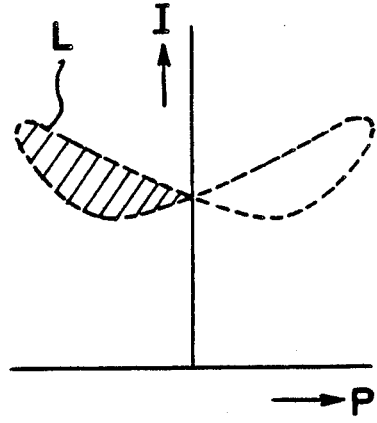
Figure 13A:
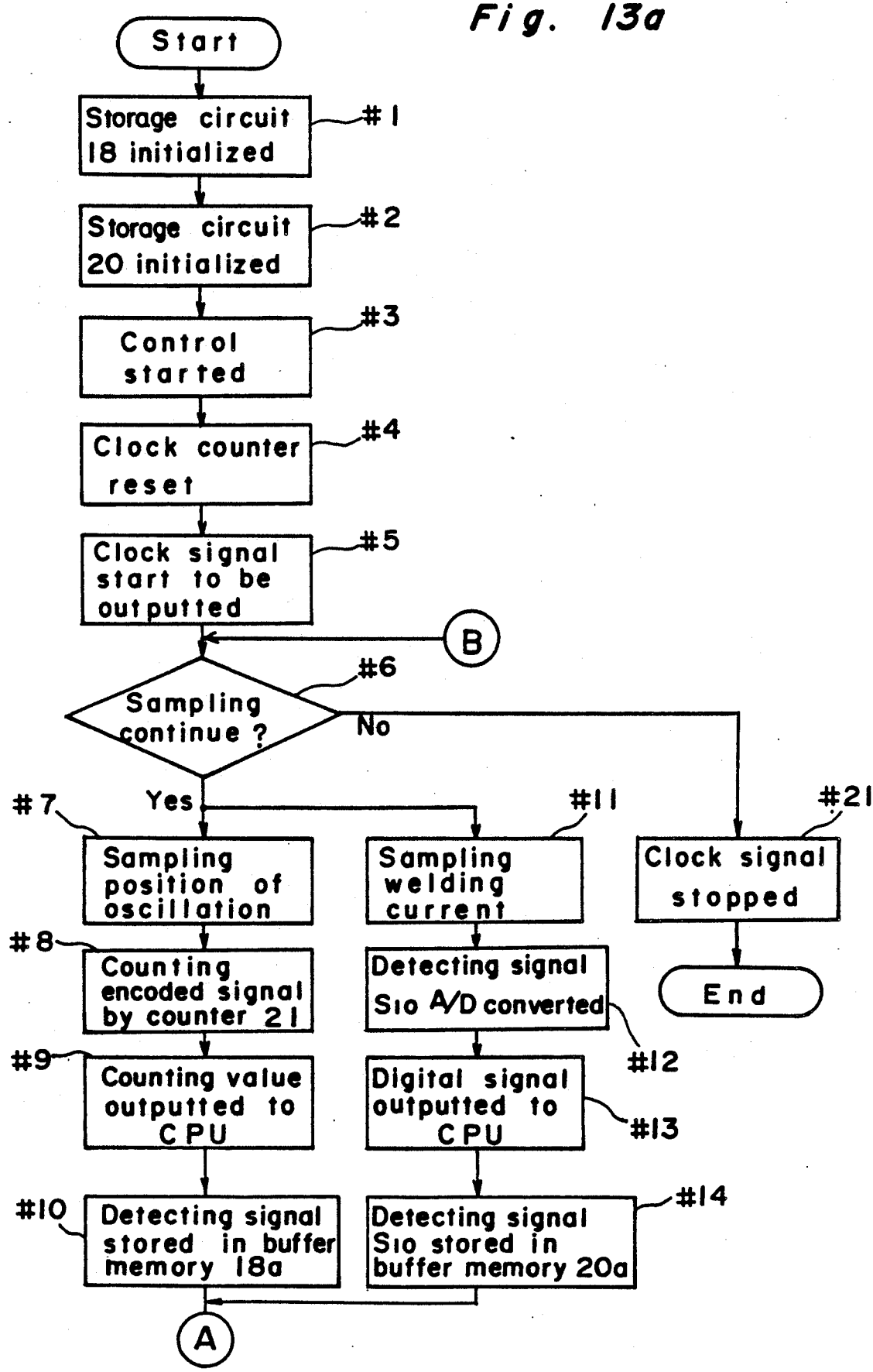
Figure 13B:
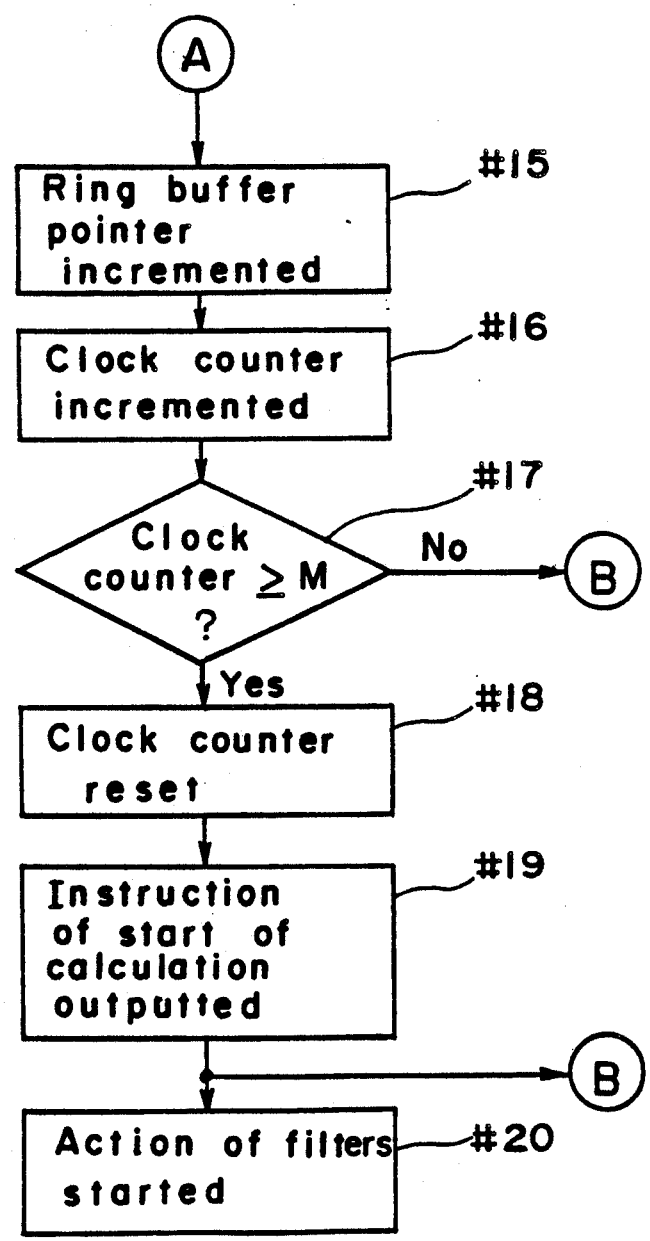
Figure 14:
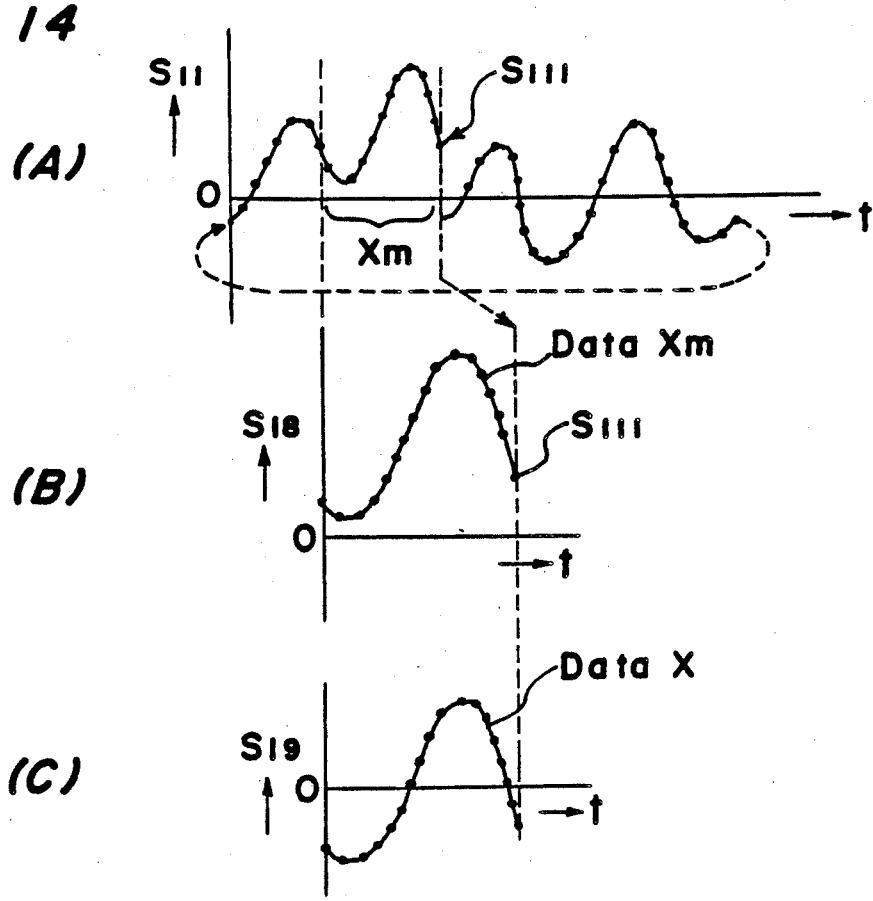
Figure 15:
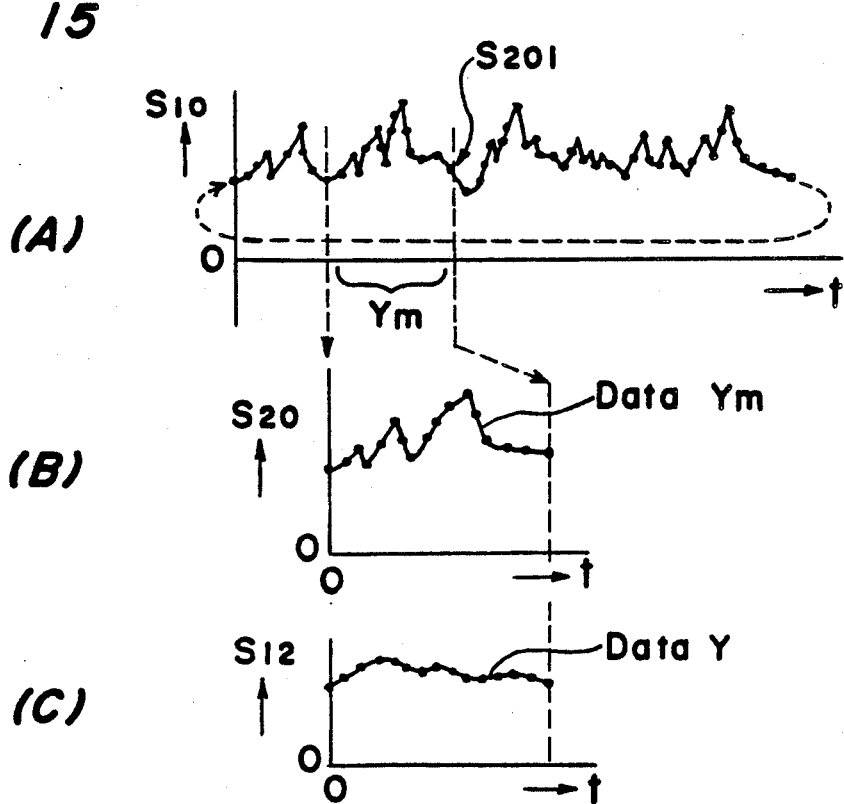
Figure 18:
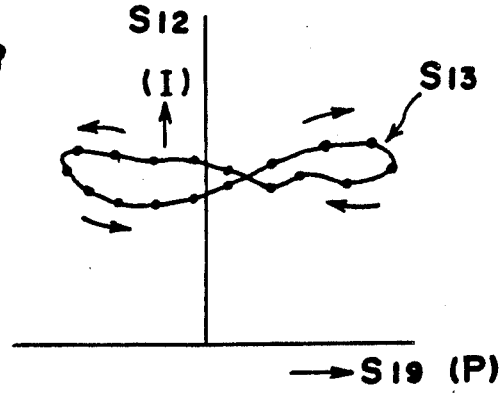
Figure 19A:
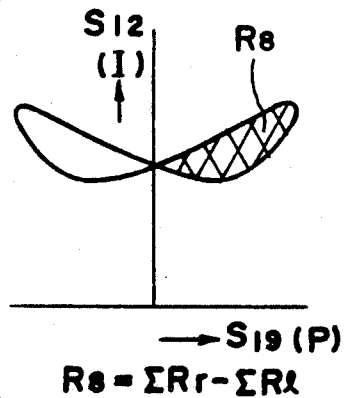
Figure 19B:
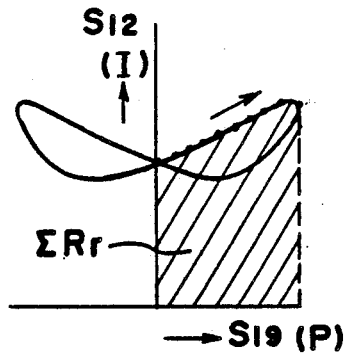
Figure 19C:
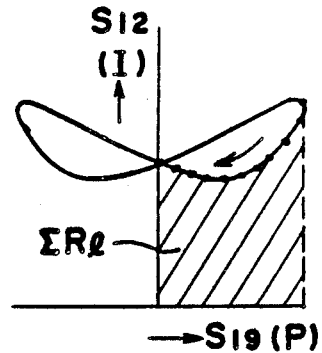
Figure 20A:
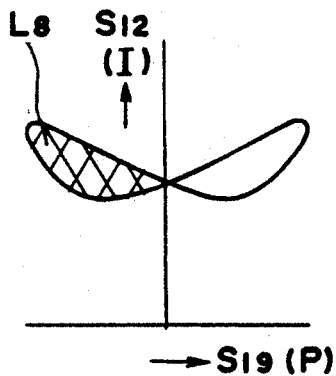
Figure 20B:
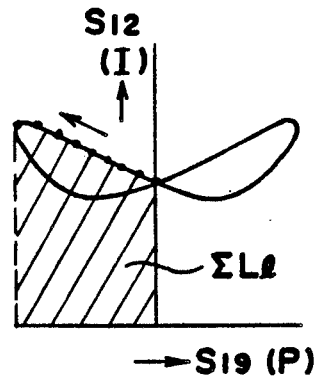
Figure 20C:
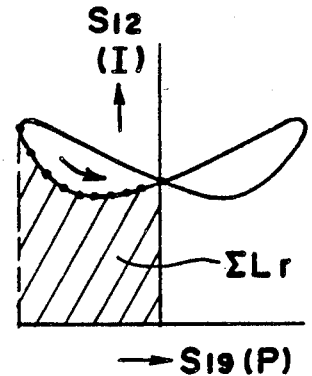
Figure 21A:
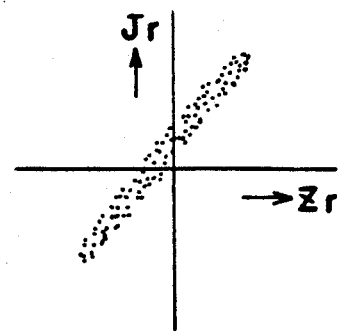
Figure 21B:
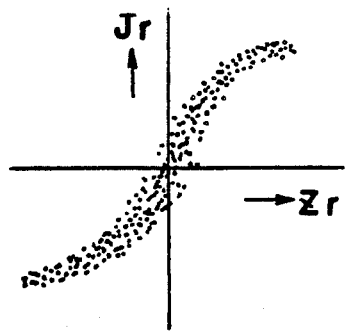
Figure 23:
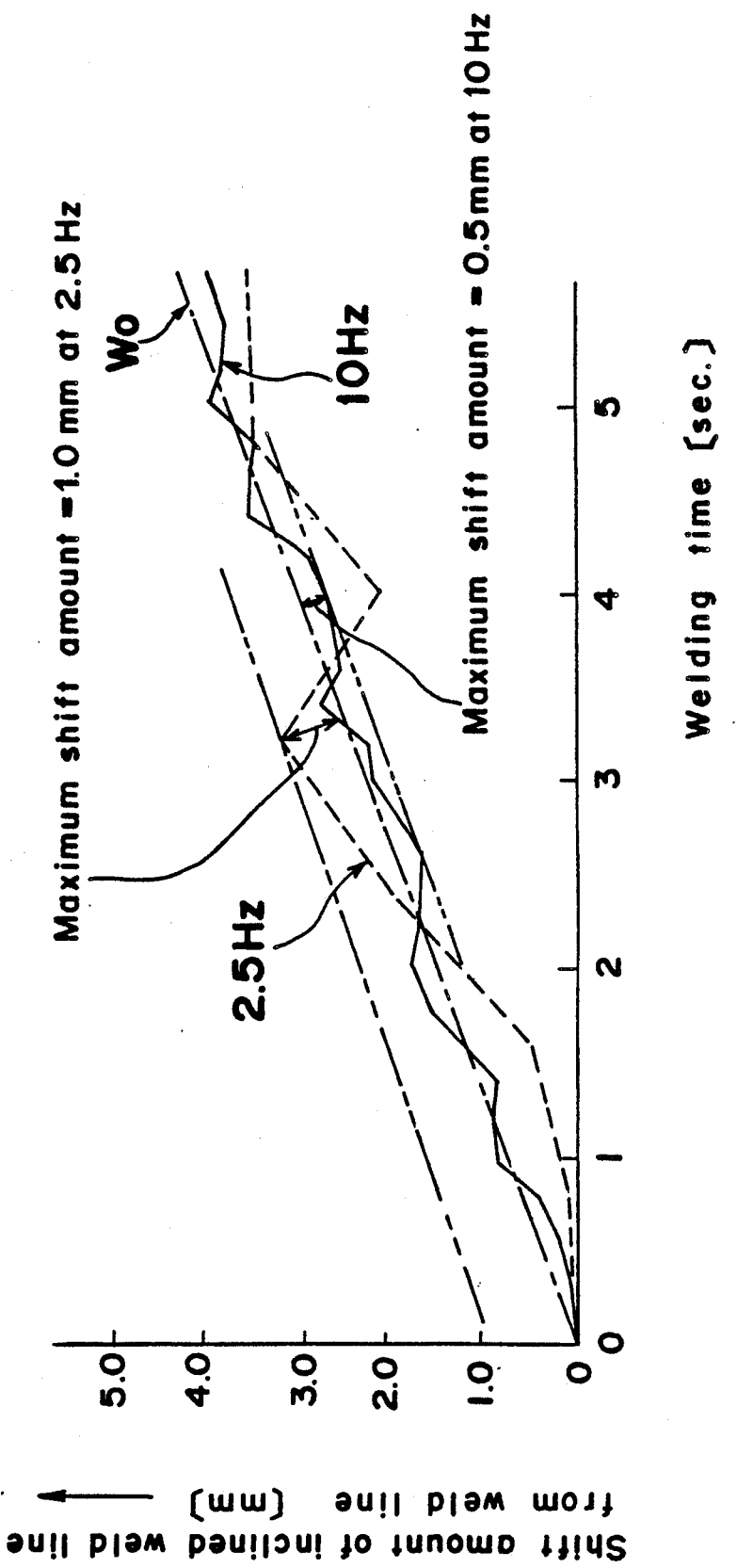

(A) of FIG. 9 is a schematic front view showing the relation between the position of the oscillating welding torch and the left and right works when the center C of the oscillation coincides with the weld line $W_0$;

(B) of FIG. 9 is a graph showing the relation between the position P of the oscillating welding torch and a passed time t;

(C) to (F) of FIG. 9 are diagrams showing loci of the welding current to the position P of the oscillating welding torch at oscillation frequencies of 0.5 Hz, 5 Hz, 7 Hz and 10 Hz, respectively;

(G) to (J) FIG. 9 are graphs showing the changes in the welding current to a passed time t corresponding to (C) to (F) of FIG. 9, respectively;

FIG. 10 is a graph showing the relation between an inductance [mH] of a circuit of a power source for welding and an oscillation frequency [Hz];

FIG. 11 is a schematic block diagram showing an arc welding apparatus utilizing a control method of the preferred embodiments according to the present invention;

FIG. 12a is a detailed schematic block diagram showing a part of the arc welding apparatus shown in FIG. 11;

FIG. 12b a chart showing a waveform of a signal outputted from a position detecting circuit 11 showing in FIG. 12a;

FIG. 12c is a chart showing a waveform of a signal outputted from a filter 12 shown in FIG. 12a;

FIG. 12d is a chart showing a waveform of a waveform signal outputted from a waveform composing circuit shown in FIG. 12a;

FIG. 12e is a chart showing a waveform of a first comparative signal outputted from an arithmetic circuit 14 shown in FIG. 12a;

FIG. 12f is a chart showing a waveform of a second comparative signal outputted from an arithmetic circuit 15 shown in FIG. 12a;

FIGS. 13a and 13b are flow charts showing a sampling action in the arc welding apparatus shown in FIG. 11 and 12a;

(A) of FIG. 14 is a chart showing the relation between a series of signal $S_{11}$ to be stored in a ring buffer memory 18a shown in FIG. 12a and a passed time t;

(B) of FIG. 14 is a chart showing the relation between a series of signal $S_{18}$ (data Xm) to be stored in a buffer memory 18b shown in FIG. 12a and the passed time t;

(C) of FIG. 14 is a chart showing the relation between a series of signal $S_{19}$ (data X) outputted from a filter 19 shown in FIG. 12a and the passed time t;

(A) of FIG. 15 is a chart showing the relation between a series of signal $S_{10}$ to be stored in a ring buffer memory 20a and the passed time;

(B) of FIG. 15 is a chart showing the relation between a series of signal $S_{20}$ (data Ym) to be stored in a buffer memory 20b and the passed time;

(C) of FIG. 15 is a chart showing the relation between a series of signal $S_{12}$ (data Y) outputted from a filter 12 and a passed time;

FIGS. 16a-16d are waveform charts showing a process of an action of the filter 19 shown in FIG. 12a;

FIG. 1, is a chart showing the relation between the data Y and Ym processed in a buffer memory 20, and a passed time;

FIG. 18 is a chart showing a waveform of a waveform signal $S_{13}$ outputted from an arithmetic circuit 13 shown in FIG. 12a;

FIGS. 19a to 19c are waveform charts showing an action of an arithmetic circuit 14 shown in FIG. 12a;

FIGS. 20a to 20c are waveform charts showing an action of an arithmetic circuit 15 shown in FIG. 12a;

FIGS. 21a and 21b are charts showing the relation between a shift amount Z by which the wire end Wa is previously shifted from the weld line $W_0$ and the difference calculated by the arithmetic circuit 16;

FIG. 22 is a graph showing the relation between a standard deviation of an error of a shift amount [mms] and an oscillation frequency [Hz]; and FIG. 23 is a graph showing the relation between a shift amount of an inclined weld line from a preset weld line and a welding time.

DETAILED DESCRIPTION OF THE PREFERRED EMBODIMENTS

Preferred embodiments according to the present invention will be described below in the order of the following items with reference to the attached drawings.

(1) Transient phenomena in characteristics of a welding power source and a generated arc
(2) Preferred embodiments corresponding to claim 1
(3) Preferred embodiments corresponding to claim 9
(4) Arc welding apparatus
(5) Sampling action of the arc welding apparatus
(6) Action of filters
(7) Calculation of a position correction signal
(8) Effect of preferred embodiments Transient Phenomena in Characteristics of a Welding Power Source and a Generated Arc The transient phenomena in the characteristics of the welding power source and the generated arc which influence a change in an arc length will be described below.

A characteristic of the welding power source is indicated by the following equation:

$$Ea = E_0 - R \cdot Ia - L \frac{dIa}{dt}, \qquad (7)$$

wherein R is a resistance of a circuit in the welding power source,

L is an inductance of the circuit in the welding power source including an inductance (phase delay component) of a control system, $E_0$ is an average value of a no-load voltage outputted from the welding power source, and Ea is an average value of a load voltage outputted from the welding power source upon welding.

The characteristic of the generated arc is indicated by the following equation:

$$Ea = E_1 + \alpha Ia + \beta \cdot B \qquad (8),$$

wherein B is an arc length, and $E_1$, $\alpha$ and $\beta$ are constants, respectively.

From an equation modified from the equation (2) and the equation (5) the following equation is obtained.

$$Vm = Vf - \frac{dA}{dt} = Vf + \frac{dB}{dt} - \frac{dD}{dt} \qquad (9)$$

From the equations (1), (5), (7) to (9), the following equation indicating a characteristic of the melting speed of the wire is obtained.

$$K_2 \frac{d^2 Ia}{dt^2} + (K_1 + b \cdot K_2 \cdot I^2 a) \frac{dIa}{dt} + \qquad (10)$$

$$\{a_0 + b_0 \cdot (D - K_0 + K_1 \cdot Ia)Ia\}Ia = Vf - \frac{dD}{dt},$$

wherein $$K_0 = \frac{E_0 - E_1}{\beta},$$

$$K_1 = \frac{R + \alpha}{\beta}, \text{ and}$$

$$K_2 = \frac{L}{\beta}.$$

Figure 5C:
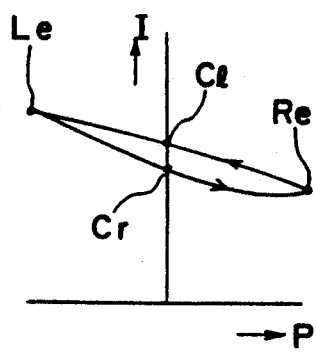
Figure 5B:
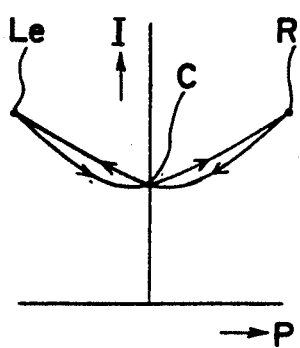
Figure 5A:
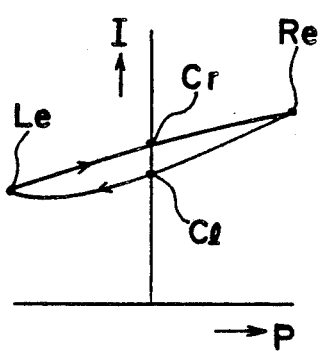
Figure 6C:
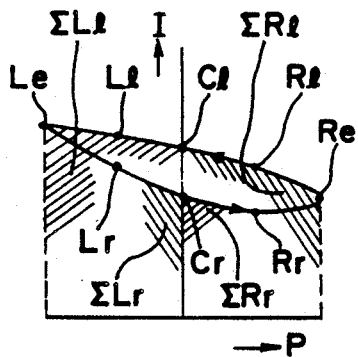
Figure 6B:
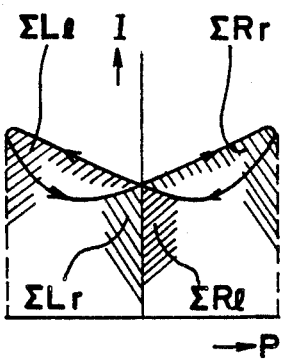
Figure 6A:
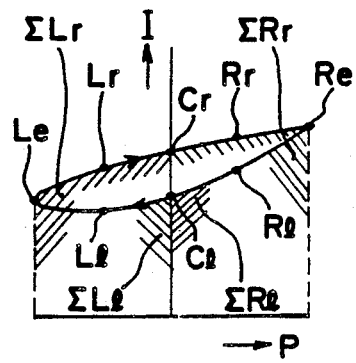
Figure 7C:
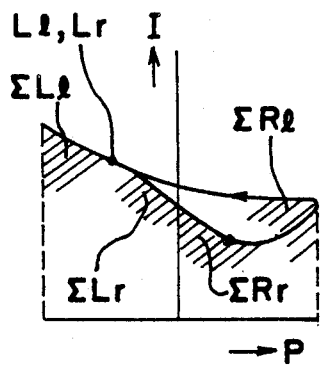
Figure 7B:
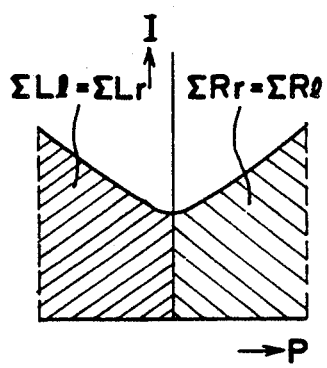
Figure 7A:
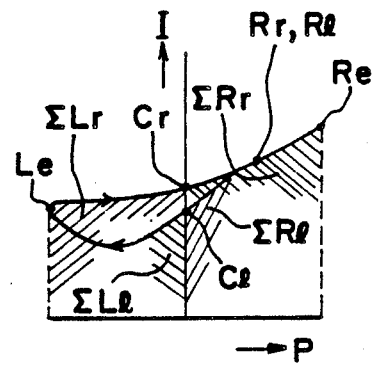
Figure 8C:
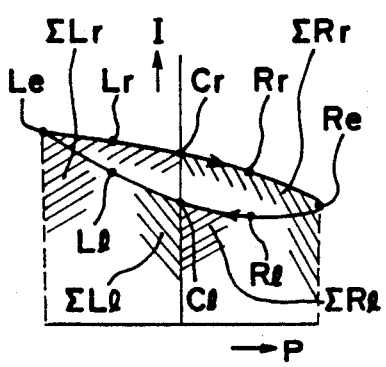
Figure 8B:
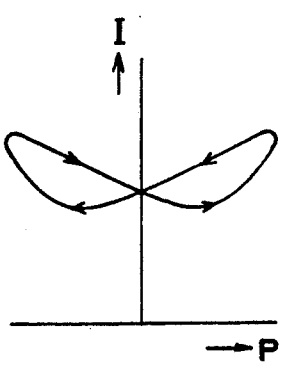
Figure 8A:
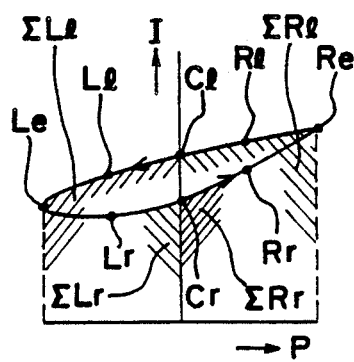

FIGS. 5a to 5c, 6a to 6c, 7a to 7c and 8a to 8c show the relationship between a position P of the oscillating welding torch WT represented by the axis of abscissa and an average value of a welding current represented by the axis of ordinate, which is obtained by a computer simulation using the equation (1), wherein FIGS. 5a to 5c show the results of the computer simulation at an extremely low oscillation frequency of 0.5 to 2 Hz, FIGS. 6a to 6c show the results thereof at a low oscillation frequency of 2 to 5 Hz, FIGS. 7a to 7c show the results thereof at a middle oscillation frequency of 5 to 7 Hz, and FIGS. 8a to 8c show the results thereof at a high oscillation frequency of 7 to 10 Hz.

Figure 4:
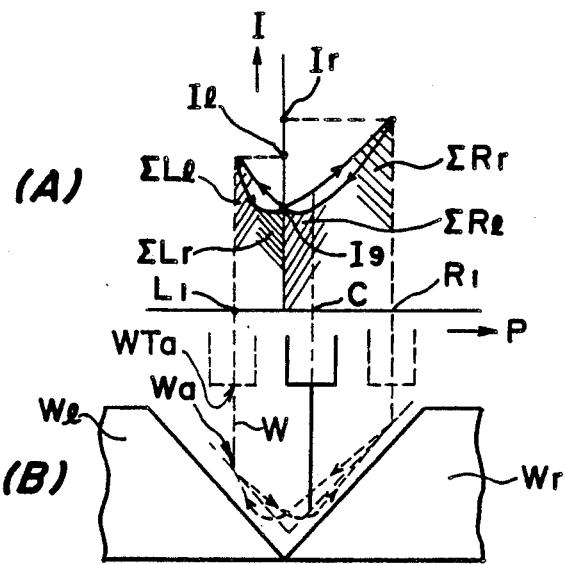
FIG. 4 is an explanative view showing the case of a small shift between the center of the oscillation and the weld line, wherein (A) of FIG. 4 is a graph showing the relation between the position of the oscillating welding torch and the welding current, and (B) of FIG. 4 is a schematic front view of the welding torch and the left and right works.

Based on the results of the computer simulation shown in FIGS. 6a to 6c, 7a to 7c and 8a to 8c, the present inventors proposed a control method for detecting a shift amount of the center point C of the oscillation from the predetermined weld line $W_0$ so as to enable the welding torch WT to trace the weld line $W_0$. As shown in FIGS. 6a to 6c, 7a to 7c and 8a to 8c when the center C of the oscillation coincides with the weld line $W_0$, namely, when no shift amount is caused, there is a minimum value in the average value of the welding current. Further, FIG. 4 shows a locus of the tip end WTa of the oscillating welding torch WT and a locus of a change in the welding current when a relatively small shift amount is caused. As shown in FIG. 4, there is a minimum value in the welding current. However, when the shift amount becomes relatively large, there is no minimum value in the welding current upon oscillating the welding torch WT. Furthermore, when a relatively high oscillation frequency is set so as to fall in the range from 7 to 10 Hz, the direction of the locus of the welding current is opposite to that at a low frequency of 2 to 5 Hz.

The preferred embodiments according to the present invention based on the results of the aforementioned computer simulation will be described below.

(2) Preferred Embodiments Corresponding to Claim 1

First preferred embodiment

The first preferred embodiment is the first embodiment of a group of embodiments corresponding to claim 1. In a control method for oscillating the welding torch WT and detecting a change in the welding current caused by changes in the arc length and the wire extension so as to enable the welding torch WT to trace the predetermined weld line $W_0$ according to a detecting signal, the following steps in the control method of the first preferred embodiment are performed sequentially.

(1) There is calculated an integrated value $\Sigma Rr$ (referred to as a first detecting signal hereinafter) of the welding current detected when the welding torch WT moves in the right direction for a time interval of the right half of the amplitude of the oscillation.

(2) There is calculated an integrated value $\Sigma Rl$ (referred to as a second detecting signal hereinafter) of the welding current detected when the welding torch WT moves in the left direction for the time interval of the right half thereof.

(3) There is calculated a ratio $R_1$ (referred to as a first comparative signal hereinafter) of the first detecting signal $\Sigma Rr$ to the second detecting signal $\Sigma Rl$.

(4) There is calculated an integrated value $\Sigma Ll$ (referred to as a third detecting signal hereinafter) of the welding current detected when the welding torch WT moves in the left direction for a time interval of the left half of the amplitude of the oscillation.

(5) There is calculated an integrated value $\Sigma Lr$ (referred to as a fourth detecting signal hereinafter) of the welding current detected when the welding torch WT moves in the right direction for the time interval of the left half thereof.

(6) There is calculated a ratio $L_1$ (referred to as a second comparative signal hereinafter) of the third detecting signal $\Sigma Ll$ to the forth detecting signal $\Sigma Lr$.

(7) A difference $J_1 = R_1 - L_1$ between the first and second comparative signals is calculated.

(8) The center C of the oscillation is moved in such a direction that the difference $J_1 = R_1 - L_1$ becomes small.

The relationship between the position P of oscillating welding torch WT and the welding current at a low oscillation frequency of 2 to 5 Hz, at a middle oscillation frequency of 5 to 7 Hz and at a high oscillation frequency of 7 to 10 Hz will be described below with reference to FIGS. 4, 6a to 6c, 7a to 7c and 8a to 8c. It is to be noted that, when no shift amount is caused at any oscillation frequency, the first comparative signal R is equal to the second comparative signal L, and the center C of the oscillation is not shifted from the predetermined weld line $W_0$, therefore, the description thereof is omitted in the preferred embodiments described hereinafter (a) Oscillation at low and middle oscillation frequencies.

In the case of FIG. 6a, since $R_1 = \Sigma Rr/\Sigma Rl > 1$ and $L_1 = \Sigma Ll/\Sigma Lr < 1$, $R_1 - L_1 < 0$, namely, the center C of the oscillation is shifted in the right direction from the weld line $W_0$. Therefore, the center C of the oscillation is moved in the left direction. In the case of FIG. 6c, since $R_1 = \Sigma Rr/\Sigma Rl < 1$ and $L_1 = \Sigma Ll/\Sigma Lr > 1$, $R_1 - L_1 < 0$, namely, the center C of the oscillation is shifted in the left direction from the weld line $W_0$. Therefore, the center C of the oscillation is moved in the right direction.

In the case of FIG. 7a, since $R_1 = \Sigma Rr/\Sigma Rl \approx 1$ and $L_1 = \Sigma Ll/\Sigma Lr < 1$, $R_1 - L_1 > 0$. Therefore, the center C of the oscillation is moved in the left direction similarly to the case of FIG. 6a. In the case of FIG. 7c, since $R_1 = \Sigma Rr/\Sigma Rl < 1$ and $L_1 = \Sigma Ll/\Sigma Lr \approx 1$, $R_1 - L_1 < 0$. Therefore, the center C of the oscillation is moved in the right direction similarly to the case of FIG. 6c.

(b) Oscillation at a high oscillation frequency

In the case of FIG. 8a, since $R_1 = \Sigma Rr/\Sigma Rl < 1$ and $L_1 = \Sigma Ll/\Sigma Lr > 1$, $R_1 - L_1 0$, namely, the sign of $R_1 - L_1$ becomes opposite to that in the case of FIG. 6a, and the center C of the oscillation is shifted in the right direction from the weld line $W_0$. Therefore, the center C of the oscillation is moved in the left direction. In the case of FIG. 8c, $R_1 - L_1 > 0$, namely, the sign of $R_1 - L_1$ becomes opposite to that in the case of FIG. 6c, and the center C of the oscillation is shifted in the left direction from the weld line $W_0$. Therefore, the center C of the oscillation is moved in the right direction.

(c) Case of a relatively small shift amount

In the case of a relatively small shift amount of the center C of the oscillation from the weld line $W_0$, the welding current in the case of FIG. 6a varies on the locus shown in FIG. 4a. In this case $R_1 = \Sigma Rr/\Sigma Rl > 1$ and $L_1 = \Sigma Ll/\Sigma Lr > 1$. However, since Ir > Il, $R_1 - L_1 > 0$. Therefore, the center C of the oscillation is moved in the left direction similarly to the case of FIG. 6a. In the case of FIG. 4c, when a relatively small shift amount is caused in the direction opposite to that of the case of FIG. 4a, $R_1 - L_1 < 0$. Therefore, the center C of the oscillation is moved in the right direction similarly to the case of FIG. 6c. In respective preferred embodiments described later, the control method for moving the center C of the oscillation in the case of a relatively small shift amount is similar to that in the case of a relatively large shift amount, therefore, the description thereof is omitted therein.

Second preferred embodiment

The second preferred embodiment is the second embodiment of a group of embodiments corresponding to claim 1. The following steps in the control method of the second preferred embodiment are performed sequentially.

(1) There is calculated a difference $R_2 = \Sigma Rr - \Sigma Rl$ (referred to as a first comparative signal hereinafter) between the first detecting signal $\Sigma Rr$ and the second detecting signal $\Sigma Rl$ which are generated in the manner similar to that of the first preferred embodiment.

(2) There is calculated a difference $L_2 = \Sigma Ll - \Sigma Lr$ (referred to as a second comparative signal hereinafter) between the third detecting signal $\Sigma Ll$ and the fourth detecting signal $\Sigma Lr$ which are generated in the manner similar to that of the first preferred embodiment.

(3) A difference $J_2 = R_2 - L_2$ between the first and second comparative signals is calculated.

(4) The center C of the oscillation of the welding torch WT is moved in such a direction that the difference $J_2$ becomes a minimum value.

The relationship between the position of the oscillation and the welding current will be described below with reference to FIGS. 6a to 6c, 7a to 7c and 8a to 8c, similarly to the first preferred embodiment.

(a) Oscillation at low and middle oscillation frequencies

In the case of FIG. 6a, since $R_2 = \Sigma Rr - \Sigma Rl > 0$ and $L_2 = \Sigma Ll - \Sigma Lr < 0$, $R_2 - L_2 > 0$. Therefore, the center C of the oscillation is moved in the left direction, similarly to the first preferred embodiment. In the case of FIG. 6c, since $R_2 = \Sigma Rr - \Sigma Rl < 0$ and $L_2 = \Sigma Ll - \Sigma Lr > 0$, $R_2 - L_2 < 0$. Therefore, the center C of the oscillation is moved in the right direction similarly to the first preferred embodiment.

In the case of FIG. 7a, since $R_2 = \Sigma Rr - \Sigma Rl \approx 0$ and $L_2 = \Sigma Ll - \Sigma Lr < 0$, $R_2 - L_2 > 0$. Therefore, the center C of the oscillation is moved in the left direction, similarly to the case of FIG. 6a. In the case of FIG. 7c, since $R_1 = \Sigma Rr - \Sigma Rl < 0$ and $L_2 = \Sigma Ll - \Sigma Lr \approx 0$, $R_1 - L_1 < 0$. Therefore, the center C of the oscillation is moved in the right direction, similarly to the case of FIG. 6c.

(b) Oscillation at a high oscillation frequency

In the case of FIG. 8a, since $R_2 = \Sigma Rr - \Sigma Rl < 0$ and $L_2 = \Sigma Ll - \Sigma Lr > 0$, $R_2 - L_2 < 0$. Therefore, the center C of the oscillation is moved in the left direction, similarly to the first preferred embodiment. In the case of FIG. 8c, since $R_2 = \Sigma Rr - \Sigma Rl > 0$ and $L_2 = \Sigma Ll - \Sigma Lr < 0$, $R_2 - L_2 > 0$. Therefore, the center C of the oscillation is moved in the right direction, similarly to the first preferred embodiment.

Third preferred embodiment

The third preferred embodiment is the third embodiment of a group of embodiments corresponding to claim 1. In a control process for oscillating the welding torch WT and detecting a change in the welding current caused by changes in the arc length and the wire extension so as to trace the predetermined weld line $W_0$ according to a detecting signal, the following steps in the control method of the third preferred embodiment are performed sequentially.

(1) There is detected a welding current Rr (referred to as a first detecting signal hereinafter) when the welding torch WT is located at a predetermined position such as a middle position of the right half of the amplitude of the oscillation while it moves in the right direction for a time interval of the right half thereof.

(2) There is detected a welding current Rl (referred to as a second detecting signal hereinafter) when the welding torch WT is located at the aforementioned predetermined position while it moves in the left direction for the time interval of the right half thereof.

(3) A ratio $R_3$ (referred to as a first comparative signal hereinafter) of the first detecting signal Rr to the second detecting signal Rl is calculated.

(4) There is detected a welding current Ll (referred to as a third detecting signal hereinafter) when the welding torch WT is located at a predetermined position such as a middle position of the left half of the amplitude of the oscillation while it moves in the left direction for a time interval of the left half thereof.

(5) There is detected a welding current Lr (referred to as a fourth detecting signal hereinafter) when the welding torch WT is located at the aforementioned predetermined position such as a middle position of the left half of the amplitude of the oscillation while it moves in the right direction for the time interval of the left half thereof.

(6) A ratio $L_3$ (referred to as a second comparative signal hereinafter) of the third detecting signal Ll to the fourth detecting signal Lr is calculated.

(7) A difference $J_3 = R_3 - L_3$ between the first and second comparative signals $R_3$ and $L_3$ is calculated.

(8) The center C of the oscillation is moved in such a direction that the difference $J_3$ becomes small.

The relationship between the position of the oscillating welding torch WT and the welding current will be described below with reference to FIGS. 6a to 6c, 7a to 7c and 8a to 8c.

(a) Oscillation at low and middle oscillation frequencies

In the case of FIG. 6a, since $R_3 = Rr/Rl > 1$ and $L_3 = Ll/Lr < 1$, $R_3 - L_3 > 0$. Therefore, the center C of the oscillation is moved in the left direction, similarly to the first preferred embodiment. In the case of FIG. 6c, since $R_3 = Rr/rl < 1$ and $L_3 = Ll/Lr > 1$, $R_3 - L_3 < 0$. Therefore, the center C of the oscillation is moved in the right direction, similarly to the first preferred embodiment.

In the cases of FIGS. 7a and 7c, $R_3 167 0$ and $L_3 \approx 0$, respectively. However, the center C of the oscillation is moved in the manner similar to the cases of FIGS. 6a and 6c.

(b) Oscillation at a high oscillation frequency

In the case of FIG. 8a, since $R_3 = Rr/Rl < 1$ and $L_3 = Ll/Lr > 1$, $R_3 - L_3 < 0$. Therefore, the center C of the oscillation is moved in the left direction, similarly to the first preferred embodiment. In the case of FIG. 8c, since $R_3 = Rr/Rl > 1$ and $L_3 = Ll/Lr < 1$, $R_3 - L_3 < 0$. Therefore, the center C of the oscillation is moved in the right direction, similarly to the first preferred embodiment.

Fourth preferred embodiment

The fourth preferred embodiment is the fourth embodiment of a group of embodiments corresponding to claim 1. The following steps in the control method of the fourth preferred embodiment are performed sequentially.

(1) There is calculated a difference $R_4 = Rr - Rl$ (referred to as a first comparative signal hereinafter) between the first and the second detecting signals Rr and Rl which are generated in the manner similar to that of the third preferred embodiment.

(2) There is calculated a difference $L_4=Ll-Lr$ (referred to as a second comparative signal hereinafter) between the third and fourth detecting signals Ll and Lr which are generated in the manner similar to that of the third preferred embodiment.

(3) A difference $J_4=R_4-L_4$ between the first and second comparative signals $R_4$ and $L_4$ is calculated.

(4) The center C of the oscillation of the welding torch WT is moved in such a direction that the difference $J_4$ becomes a minimum value.

The relationship between the position P of the oscillating welding torch WT and the welding current will be described below with reference to FIGS. 6a to 6c, 7a to 7c and 8a to 8c, similarly to the first preferred embodiment.

(a) Oscillation at low and middle oscillation frequencies

In the case of FIG. 6a, since $R_4=Rr-Rl>0$ and $L_4=Ll-Lr<0$, $R_4-L_4>0$. Therefore, the center C of the oscillation is moved in the left direction, similarly to the first preferred embodiment. In the case of FIG. 6c, since $R_4=Rr-Rl<0$ and $L_4=Ll-Lr>0$, $R_4-L_4>0$. Therefore, the center C of the oscillation is moved in the right direction, similarly to the first preferred embodiment.

In the cases of FIGS. 7a and 7c, $R_4 \approx 0$ and $L_4 \approx 0$, respectively. However, the center C of the oscillation is moved in the manner similar to the cases of FIGS. 6a and 6c.

(b) Oscillation at a high oscillation frequency

In the case of FIG. 8a, since $R_4=Rr-Rl<0$ and $L_4=Ll-Lr>0$, $R_4-L_4<0$. Therefore, the center C of the oscillation is moved in the left direction, similarly to the first preferred embodiment. In the case of FIG. 8c, since $R_4=Rr-Rl>0$ and $L_4=Ll-Lr<0$, $R_4-L_4<0$. Therefore, the center C of the oscillation is moved in the right direction, similarly to the first preferred embodiment.

Fifth preferred embodiment

The fifth preferred embodiment is the fifth embodiment of a group of embodiments corresponding to claim 1.

As shown in FIGS. 6b and 8b, when the center C of the oscillation coincides with the weld line $W_0$, the rotation direction in the locus of the welding current at a low oscillation frequency of 2 to 5 Hz is opposite to that at a high oscillation frequency of 7 to 10 Hz. Namely, at a frequency of 2 to 5 Hz, as shown in FIG. 6b, the locus of the welding current rotates in the clockwise direction at the right edge of the oscillation, and the locus thereof rotates in the counterclockwise direction at the left edge thereof. The rotation direction of this locus is referred to as a normal rotation direction hereinafter. On the contrary, at a high oscillation frequency of 7 to 10 Hz, as shown in FIG. 8b, the locus of the welding current rotates in the counterclockwise direction at the right edge of the oscillation, and the locus thereof rotates in the clockwise direction at the left edge thereof. The rotation direction of this locus is referred to as a reverse rotation direction hereinafter.

In the present preferred embodiment, substantially the same control method is used at an oscillation frequency in the range from a low frequency of 2 to 5 Hz to a high frequency of 7 to 10 Hz, and respective polarities of the first and second comparative signals R and L or the difference signal of the first to fourth preferred embodiments switched over from one sign to another sign at an oscillation frequency of about 6 Hz.

The reason why the locus of the welding current rotates in the reverse rotation direction at a high oscillation frequency of 7 to 10 Hz is that a change in the welding current can not follow a change in the characteristic of the melting speed of the wire indicated by the equation (9) because of the influence of $$L\left(\frac{dIa}{dt}\right)$$

in the equation (7) indicating the characteristic of the power source for welding.

FIG. 9a shows the relationship between the position P of the oscillating welding torch WT and the position of the works when the center C of the oscillation is located on the weld line $W_0$, namely, when the center C thereof is not shifted from the weld line $W_0$, and FIG. 9b shows the relationship between the position P of the oscillating welding torch WT and a passed time t.

FIGS. 9c to 9f show the loci of a change in a welding current I to the position P of the oscillating welding torch WT at oscillation frequencies of 0.5 Hz, 5 Hz, 7 Hz and 10 Hz, respectively, and FIGS. 9g to 9j show changes in the welding current to a passed time t at the aforementioned oscillation frequencies, respectively. For example, at an extremely low oscillation frequency of 0.5 Hz, when the position P of the oscillating welding torch WT is located at a edge position $R_0$ corresponding to the right edge of the oscillation as shown in (B) of FIG. 9, the welding current becomes a maximum value $I_5$ as shown in (G) of FIG. 9, and a change in the position P of the oscillating welding torch WT has the same phase as that of a change in the welding current I.

Figure 3:
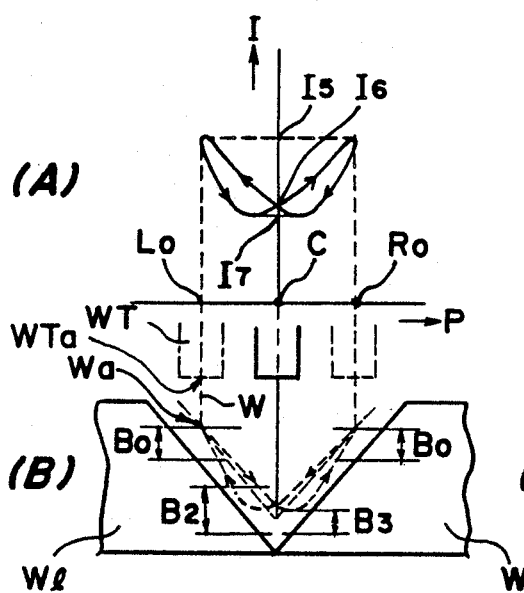
FIG. 3 is an explanative view showing the case of no shift between the center of the oscillation and the weld line at an oscillation frequency of about 2 to 5 Hz, wherein (A) of FIG. 3 is a graph showing the relation between the position of the oscillating welding torch and the welding current, and (B) of FIG. 3 is a schematic front view of the welding torch and the left and right works.

When the oscillation frequency is heightened from the extremely low oscillation frequency of 0.5 Hz and becomes a low frequency of 5 Hz, the change in the melting ratio of the wire can not follow the change in the distance of the edge of the welding torch WT as described above referring to FIGS. 3a and 3b, resulting in that the arc length varies and the welding current varies. Therefore, as shown in (H) of FIG. 9, the timing of the maximum value $I_5$ of the welding current is advanced by a time interval $\theta_1$ from the timing of the edge position $R_0$ of the oscillating welding torch WT corresponding to the right edge of the oscillation. Then, when (B) and (H) of FIG. 9 are composed so as to erase a time component t, the locus of the welding current to the position P of the oscillating welding torch WT rotates in the normal rotation direction as shown in (D) of FIG. 9.

Further, at a middle oscillation frequency of about 7 Hz, as shown in (I) of FIG. 9, the timing of the maximum value $I_5$ of the welding current I is delayed from that at a low oscillation frequency of 5 Hz because of the inductance of the power source, resulting in that the timing of the maximum value $I_5$ of the welding current I has the same phase as that of the edge position $R_0$. Then, when (B) and (I) of FIG. 9 are composed so as to erase a time component t, the locus of the welding current I to the position P of the welding torch WT oscillated in the right direction almost coincides with that in the left direction. It is to be noted that, when the center C of the oscillation is shifted from the weld line $W_0$, the locus of the welding current is shown in FIGS. 7a and 7c.

Furthermore, at a high oscillation frequency of about 10 Hz, as shown in (J) of FIG. 9, the timing of the maximum value $I_5$ of the welding current I is further delayed from that at an oscillation frequency of 7 Hz corresponding to the edge position $R_0$ of the position P of the oscillating welding torch WT because of a large influence of the inductance of the power source, and then, the timing of the maximum value $I_5$ of the welding current I is delayed by a time interval $\theta_2$ from the timing of the edge position $R_0$ corresponding to the right edge of the oscillating welding torch WT. Then, when (B) and (J) of FIG. 9 are composed so as to erase a time component t, as shown in (F) of FIG. 9, the locus of the welding current to the position P of the oscillating welding torch WT rotates in the rotation direction (the reverse rotation direction) opposite to that at an oscillation frequency of 5 Hz shown in (D) of FIG. 9.

FIG. 10 is a graph showing the relationship between the inductance [mH] of the circuit of the power source for welding represented by the axis of abscissa and the oscillation frequency [Hz] represented by the axis of ordinate. As shown in FIG. 10, for example, when the inductance thereof is 0.25 [mH], the oscillation frequency when the rotation direction of the locus of the welding current I changes from the normal rotation direction to the reverse rotation direction is 6.5 [Hz]. Furthermore, when the inductance thereof is increased to 1.0 [Hz], the oscillation frequency when the rotation direction of the locus changes from the normal rotation direction to the reverse rotation direction is lowered to 3.0 [Hz].

(3) Preferred embodiments corresponding to claim 9

In the preferred embodiments corresponding to claim 1 as described above, it is utilized that the locus of the welding current I varying in the left direction upon oscillating the welding torch WT is different from that in the right direction, at an oscillation frequency in the range from a low frequency of 2 to 5 Hz to a high frequency of 7 to 10 Hz, and the shift amount of the center C of the oscillation from the weld line $W_0$ is detected. However, when the oscillation frequency becomes extremely lower than 2 Hz, the arc length is kept at a constant value, and there is no difference between the locus of the welding current I varying in the left and right directions upon oscillating the welding torch WT, and then, the shift amount of the center C of the oscillation from the weld line $W_0$ can not be detected.

In order to solve the aforementioned problem, in a control method for enabling the welding torch WT to trace the weld line $W_0$ according to the preferred embodiments corresponding to claim 9, there are combined a conventional oscillating process at a low oscillation frequency wherein there is no difference between the locus of the welding current I varying in the left and right directions upon oscillating the welding torch WT, and the oscillating process according to the preferred embodiments corresponding to claim 1 wherein there is a difference therebetween are combined, resulting in that the oscillating process is performed at oscillation frequencies in the range from an extremely low frequency of 0.5 Hz to an high frequency of 10 Hz.

Sixth preferred embodiment

The sixth preferred embodiment is the first embodiment of a group of embodiments corresponding to claim 9. In a control method for oscillating the welding torch WT and detecting a change in the welding current I caused by changes in the arc length and the wire extension so as to trace the predetermined weld line $W_0$ according to a detecting signal, the following process of the sixth preferred embodiment is performed sequentially.

(1) There is detected a welding current Re (referred to as a first detecting signal hereinafter) when the welding torch WT is located at the right edge of the oscillation after it moves in the right direction of the amplitude of the oscillation.

(2) There is detected a welding current Cl (referred to as a second detecting signal hereinafter) when the welding torch WT is located at the center C of the oscillation while it moves in the left direction of the amplitude of the oscillation.

(3) There is calculated a ratio $R_6=Re/Cl$ (referred to as a first comparative signal hereinafter) of the first detecting signal Re to the second detecting signal Cl.

(4) There is detected a welding current Le (referred to as a third detecting signal hereinafter) when the welding torch WT is located at the left edge of the oscillation after it moves in the left direction of the amplitude of the oscillation.

(5) There is detected a welding current Cr (referred to as a fourth detecting signal hereinafter) when the welding torch WT is located at the center C of the oscillation while it moves in the right direction of the amplitude of the oscillation.

(6) There is calculated a ratio $L_6=Le/Cr$ (referred to as a second comparative signal hereinafter) of the third detecting signal Le to the fourth detecting signal Cr.

(7) A difference $J_6=R_6-L_6$ between the third detecting signal $R_6$ and the fourth detecting signal $L_6$ is calculated.

(8) The center C of the oscillation is moved in such a direction that the difference $J_6$ becomes small.

In order to improve the precision of calculating the first and second comparative signals $R_6$ and $L_6$, a method for calculating the first and second comparative signals $R_6$ and $L_6$ at a high oscillation frequency may be different from that at a low oscillation frequency as follows. Namely, at a low oscillation frequency, the first and second comparative signals $R_6$ and $L_6$ are calculated as described above. On the contrary, at a high oscillation frequency, the first comparative signal $R_6$ is calculated as a ratio Re/Cr and the second comparative signal $L_6$ is calculated as a ratio Le/Cl.

The relationship between the position P of the oscillating welding torch WT and the welding current I will be described below with reference to FIGS. 5a to 5c, 6a to 6c, 7a to 7c and 8a to 8c, in the present preferred embodiment used at oscillation frequencies in the range from an extremely low frequency of 0.5 Hz to a high frequency of 10 Hz.

(a) Oscillation at an extremely low oscillation frequency

In the case of FIG. 5a, since $R_6=Re/Cl>1$ and $L_6=Le/Cr<1$, $R_6-L_6>0$. Therefore, the center C of the oscillation is moved in the left direction, similarly to the first preferred embodiment. In the case of FIG. 5c, since $R_6=Re/Cl<1$ and $L_6=Le/Cr>1$, $R_6-L_6<0$. Therefore, the center C of the oscillation is moved in the right direction, similarly to the first preferred embodiment.

(b) Oscillation at low and middle oscillation frequencies

In the case of FIG. 6a, since $R_6=Re/Cl>1$ and $L_6=Le/Cr<1$, $R_6-L_6>0$. Therefore, the center C of the oscillation is moved in the left direction, similarly to the first preferred embodiment. In the case of FIG. 6c, since $R_6=Re/Cl<1$ and $L_6=Le/Cr>1$, $R_6-L_6<0$. Therefore, the center C of the oscillation is moved in the right direction, similarly to the first preferred embodiment.

In the cases of FIGS. 7a and 7c, $L_6\simeq1$ and $R_6\simeq1$, respectively. Therefore, the center C of the oscillation is moved in the manner similar to the first preferred embodiment.

(c) Oscillation at a high oscillation frequency

In the case of FIG. 8a, since $R_6=Re/Cl>1$ and $L_6=Le/Cr\simeq1$, $R_6-L_6>0$. Therefore, the center C of the oscillation is moved in the left direction, similarly to the case of FIG. 6a. In the case of FIG. 8c, since $R_6=Re/Cl\simeq1$ and $L_6=Le/Cr>1$, $R_6-L_6<0$. Therefore, the center C of the oscillation is moved in the right direction, similarly to the case of FIG. 6c. It is to be noted that, at a high oscillation frequency, the second detecting signal Cl is replaced with the fourth detecting signal Cr upon calculating the first and second comparative signals $R_6$ and $L_6$. Then, the precision of calculating the first and second comparative signals $R_6$ and $L_6$ can be improved since the ratio Re/Cr and the ratio Le/Cl are larger than the ratio Re/Cl and the ratio Le/Cr, respectively.

Seventh preferred embodiment

The seventh preferred embodiment is the second embodiment of a group of embodiments corresponding to claim 9. The following steps in the control method of the seventh preferred embodiment are performed sequentially.

(1) There is calculated a difference $R_7=Re-Cl$ between the first detecting signal Re and the second detecting signal Cl which are generated in the manner similar to that of the sixth preferred embodiment.

(2) There is calculated a difference $L_7=Le-Cr$ between the third detecting signal Le and the fourth detecting signal Cr which are generated in the manner similar to that of the sixth preferred embodiment.

(3) A difference $J_7=R_7-L_7$ between the differences $R_7$ and $L_7$ is calculated.

(4) The center C of the oscillation is moved in such a direction that the difference $J_7$ becomes a minimum value.

In order to improve the precision of calculating the differences $R_7$ and $L_7$, a method for calculating the differences $R_7$ and $L_7$ at a high oscillation frequency may be different from that at a low oscillation frequency as follows. Namely, at a low oscillation frequency, the differences $R_7$ and $L_7$ are calculated as described above. On the contrary, at a high oscillation frequency, the difference $R_7$ is calculated as (Re-Cr) and the difference $L_7$ is calculated as (Le-Ce).

The relationship between the position P of the oscillating welding torch WT and the welding current will be described below with reference to FIGS. 5a to 5c, 6a to 6c, 7a to 7c and 8a to 8c.

(a) Oscillation at an extremely low frequency

In the case of FIG. 5a, since $R_7=Re-Cl>0$ and $L_7=Le-Cr<0$, $R_7-L_7>0$. Therefore, the center C of the oscillation is moved in the left direction, similarly to the first preferred embodiment. In the case of FIG. 5c, since $R_7=Re-Cl<0$ and $L_7=Le-Cr>0$, $R_7-L_7>0$. Therefore, the center C of the oscillation is moved in the right direction, similarly to the first preferred embodiment.

(b) Oscillation at low and middle oscillation frequencies

In the case of FIG. 6a, since $R_7=Re-Cl>0$ and $L_7=Le-Cr<0$, $R_7-L_7>0$. therefore, the center C of the oscillation is moved in the left direction, similarly to the first preferred embodiment. In the case of FIG. 6c, since $R_7=Re-Cl<0$ and $L_7=Le-Cr>0$, $R_7L_7<0$. Therefore, the center C of the oscillation is moved in the right direction, similarly to the first preferred embodiment.

In the cases of FIGS. 7a and 7c, $L_6\simeq0$ and $R_6\simeq0$, respectively. Then, the center C of the oscillation is moved in the manner similar to the cases of FIGS. 6a and 6c.

(c) Oscillation at a high oscillation frequency

In the case of FIG. 8a, since $R_7=Re-Cl>0$ and $L_7=Le-Cr\simeq0$, $R_7-L_7>0$. Therefore, the center C of the oscillation is moved in the left direction, similarly to the case of FIG. 6a. In the case of FIG. 8c, since $R_7=Re-Cl\simeq0$ and $L_7=Le-Cr>0$, $R_7L_7<0$. Therefore, the center C of the oscillation is moved in the right direction, similarly to the case of FIG. 6c.

In order to improve the precision of calculating the differences $R_7$ and $L_7$, a method for calculating the differences $R_7$ and $L_7$ at a high oscillation frequency may be different from that at low and middle oscillation frequencies as follows. Namely, at a high oscillation frequency, the difference $R_7$ is calculated as (Re-Cr) and the difference $L_7$ is calculated as (Le-Cl). The precision of calculating the differences $R_7$ and $L_7$ can be improved since the difference (Re-Cr) and the difference (Le-Cl) are larger than the difference (Re-Cl) and the difference (Le-Cr), respectively.

(4) Arc welding apparatus

FIG. 11 is a schematic diagram showing an arc welding apparatus utilizing the control method of the present preferred embodiments according to the present invention.

FIG. 12a is a detailed schematic block diagram of a part of the arc welding apparatus shown in FIG. 11.

Referring to FIG. 12a, the welding torch WT is mounted on a wrist of a welding robot 1, and a consumable electrode W having a wire end Wa is mounted at the end portion of the welding torch WT. There are provided a left work Wl and a right work Wr so that they faces each other along the weld line $W_0$. A welding power source 9 is connected through a welding current detector 10 between the welding torch WT and the works Wl and Wr, and the welding current detector 10 detects a welding current $S_9$ and outputs a signal $S_{10}$ thereof. There is provided a positional controller 8 for controlling the welding robot 1 so as to enable the welding torch WT to trace the weld line $W_0$ and oscillate the welding torch WT in directions solidly crossing the weld line $W_0$ as indicated by arrows $L_0$ and $R_0$. Furthermore, the positional controller 8 outputs a pulse signal $S_8$ indicating the position of the welding torch WT, responsive to a positional signal outputted from a positional detector (not shown) for detecting the position of the welding torch WT. A position detecting circuit 11 outputs an oscillation position detecting signal $S_{11}$ shown in FIG. 12b, responsive to the pulse signal $S_8$.

A storage circuit 18 is comprised of a ring buffer memory 18a and a buffer memory 18b. The ring buffer memory 18a stores a series of oscillation position detecting signal $S_{11}$ shown in FIG. 14a which is outputted from the position detecting circuit 11. A series of oscillation position detecting signal (referred to as data Xm hereinafter) for one or plural N periods of the oscillation such as one period before the latest oscillation position detecting signal $S_{11}$ indicated by a ring buffer pointer is read out from the ring buffer memory 18a and is stored in the buffer memory 18b, as shown in (B) of FIG. 14. The data Xm is read out from the buffer memory 18b and is input to a filter 19. The filter 19 rejects an audio frequency noise included in the signal $S_{18}$ of the data Xm and the drift thereof, and outputs a series of filtered signal $S_{19}$ (referred to as data X hereinafter) shown in FIG. 14c.

A storage circuit 20 is comprised of a ring buffer memory 20a and a buffer memory 20b. The ring buffer memory 20a stores a series of welding current detecting signal $S_{10}$ shown in FIG. 15a which is outputted from the welding current detector 10. A series of welding current detecting signal (referred to as data Ym hereinafter) for one or plural N periods of the oscillation such as one period before the latest welding current detecting signal $S_{10}$ indicated by a ring buffer pointer is read out from the ring buffer memory 20a and is stored in the buffer memory 20b, as shown in (B) of FIG. 15. The data Ym is read out from the buffer memory 20b and is input to a filter 12. The filter 12 rejects a high frequency noise included in the signal $S_{20}$ of the data Ym and outputs a series of filtered signal $S_{12}$ (referred to as data Y hereinafter) shown in FIG. 15c. A waveform composing circuit 13 outputs a waveform signal $S_{13}$ shown in FIG. 12d indicating a change in the welding current I to the position P of the oscillating welding torch WT, responsive to the filtered signals $S_{19}$ and $S_{12}$.

An arithmetic circuit 14 compares the first welding current detecting signal generated when the welding torch WT moves in the right direction for a first time interval of the right half of the amplitude of the oscillation, with the second welding current detecting signal generated when the welding torch WT moves in the left direction for the first time interval, so as to output the first comparative signal R shown in FIG. 12e, responsive to the waveform signal $S_{13}$, as described in detail later. An arithmetic circuit 15 compares the third welding current detecting signal generated when the welding torch WT moves in the left direction for a second time interval of the left half of the amplitude of the oscillation, with the fourth welding current detecting signal generated when the welding torch WT moves in the right direction for the second time interval, so as to output the second comparative signal L shown in FIG. 12f, responsive to the waveform signal $S_{13}$, as described in detail later. Furthermore, an arithmetic circuit 16 generates a difference signal $J = R - L$ between the first and second comparative signals R and L and outputs it to an arithmetic circuit 26. The arithmetic circuit 26 generates a shift signal Z indicating the direction in which the center C of the oscillation is shifted from the weld line $W_0$ and the shift amount thereof, based on a function $F(J)$, responsive to the difference signal J. A position correction circuit 17 calculates a manipulated variable Q of the center C of the oscillation, responsive to the shift signal Z and outputs a signal indicating the manipulated variable Q to a driver 25. The driver 25 generates a correction signal $S_{17}$ for correcting the center C of the oscillation, responsive to the signal indicating the manipulated variable Q, and outputs it to the positional controller 8.

Referring to FIG. 11, the composition of the arc welding apparatus will be described below, and the description of the circuits indicated by the same numerals as that shown in FIG. 12a is omitted therein.

A robot controller 2 comprises the position detecting circuit 11 and the positional controller 8. A controller 3 for enabling the welding torch WT to trace the weld line $W_0$ comprises the circuits 12 to 26 shown in FIG. 12a. A cumulative counter 21 is included in the position detecting circuit 11, the cumulative counter 21 counts an encoded signal indicating the position P of the oscillation and outputs the counting value to a CPU 23 comprising the circuits 12 to 17, 19 and 26. A main storage circuit 24 comprises the circuits 18 and 20 shown in FIG. 12a. The welding current detecting circuit 10 is comprised of a Hall device 10a for detecting the welding current I, an amplifier 10b, a sampling and hold circuit 10c and an analogue to digital converter (referred to as an A/D converter hereinafter) 10d.

The aforementioned arithmetic circuits 14 and 15 calculate in respective preferred embodiments as follows.

(a) First preferred embodiment

The arithmetic circuit 14 calculates the integrated value $\Sigma Rr$ (the first detecting signal) of the welding current detected when the welding torch WT moves in the right direction for the first time interval of the right half of the amplitude of the oscillation, responsive to the waveform signal $S_{13}$, and calculates the integrated value $\Sigma Rl$ (the second detecting signal) of the welding current detected when the welding torch WT moves in the left direction for the first time interval, responsive to the waveform signal $S_{13}$. Furthermore, the arithmetic circuit 14 calculates the ratio $\Sigma Rr/\Sigma Rl$ and outputs the first comparative signal $R_1$ having the level of the ratio $\Sigma Rr/\Sigma Rl$.

The arithmetic circuit 15 calculates the integrated value $\Sigma Ll$ (the third detecting signal) of the welding current detected when the welding torch WT moves in the left direction for the second time interval of the left half of the amplitude of the oscillation, responsive to the waveform signal $S_{13}$, and calculates the integrated value $\Sigma Lr$ (the fourth detecting signal) of the welding current detected when the welding torch WT moves in the right direction for the second time interval, responsive to the waveform signal $S_{13}$. Furthermore, the arithmetic circuit 15 calculates the ratio $\Sigma Ll/\Sigma Lr$ and outputs the second comparative signal $L_1$ having the level of the ratio $\Sigma Ll/\Sigma Lr$.

(b) Second preferred embodiment

The arithmetic circuit 14 generates the first and second detecting signals $\Sigma Rr$ and $\Sigma Rl$ in the manner similar to the first preferred embodiment, and calculates the difference $(\Sigma Rr - \Sigma Rl)$ between respective levels of the first and second detecting signals $\Sigma Rr$ and $\Sigma Rl$ and outputs the first comparative signal $R_2$ having the level of the difference $(\Sigma Rr - \Sigma Rl)$.

The arithmetic circuit 15 generates the third and fourth detecting signals $\Sigma Ll$ and $\Sigma Lr$ in the manner similar to the first preferred embodiment, and calculates the difference $(\Sigma Ll - \Sigma Lr)$ between respective levels of the third and fourth detecting signals $\Sigma Ll$ and $\Sigma Lr$ and outputs the second comparative signal $L_2$ having the level of the difference $(\Sigma Ll - \Sigma Lr)$.

(c) Third preferred embodiment

The arithmetic circuit 14 calculates the ratio $R_3 = Rr/Rl$ (the first comparative signal) of the welding current signal Rr (the first detecting signal) detected when the welding torch WT is located at a middle position while it moves in the right direction for the first time interval of the right half of the amplitude of the oscillation, to the welding current signal Rl (the second detecting signal) detected when the welding torch WT is located at a middle position while it moves in the left direction for the first time interval, responsive to the waveform signal $S_{13}$. Furthermore, the arithmetic circuit 14 calculates the ratio Rr/Rl and outputs the first comparative signal $R_3$ having the level of the ratio Rr/Rl.

The arithmetic circuit 15 calculates the ratio $L_3 = Ll/Lr$ (the second comparative signal) of the welding current signal Ll (the third detecting signal) detected when the welding torch WT is located at a middle position while it moves in the left direction for the second interval of the left half of the amplitude of the oscillation, to the welding current signal Lr (the fourth detecting signal) detected when the welding torch WT is located at a middle position while it moves in the right direction for the second time interval, responsive to the waveform signal $S_{13}$, and outputs the second comparative signal $L_3$.

(d) Fourth preferred embodiment

The arithmetic circuit 14 generates the first and second detecting signals Rr and Rl in the manner similar to the third preferred embodiment, calculates the difference (Rr − Rl) between respective levels of the first and second detecting signals Rr and Rl, and outputs the first comparative signal $R_4$. The arithmetic circuit 15 generates the third and fourth detecting signals Ll and Lr in the manner similar to the third preferred embodiment, calculates the difference (Ll − Lr) between respective levels of the third and fourth detecting signals Ll and Lr, and outputs the second comparative signal $L_4$.

(e) Fifth preferred embodiment

In the fifth preferred embodiment, the point different from the first to fourth preferred embodiments is that respective polarities of the first and second comparative signals R and L are inverted at a high oscillation frequency of 7 to 10 Hz.

(f) Sixth preferred embodiment

The arithmetic circuit 14 calculates the ratio Re/Cl of the welding current (the first detecting signal) detected when the welding torch WT is located at the right edge of the oscillation after it moves in the right direction, to the welding current Cl (the second detecting signal) detected when the welding torch WT is located at the center C of the oscillation while it moves in the left direction, responsive to the waveform signal $S_{13}$, and outputs the first comparative signal $R_6$ having the level of the ratio Re/Cl.

The arithmetic circuit 15 calculates the ratio Le/Cr of the welding current Le (the third detecting signal) detected when the welding torch WT is located at the left edge of the oscillation while it moves in the left direction, to the welding current Cr (the fourth detecting signal) detected when the welding torch WT is located at the center C of the oscillation while it moves in the right direction, responsive to the waveform signal $S_{13}$, and outputs the second comparative signal $L_6$ having the level of the ratio Le/Cr.

In order to improve the precision of calculating the aforementioned ratios, a signal having the level of the ratio Re/Cr may be outputted as the first comparative signal $R_6$, and a signal having the level of the ratio Le/Cl may be outputted as the second comparative signal $L_6$.

(g) Seventh preferred embodiment

The arithmetic circuit 14 generates the first and second detecting signals Re and Cl in the manner similar to the sixth preferred embodiment, calculates the difference (Re − Cl) between respective levels of the first and second detecting signals Re and Cl, and outputs the first comparative signal $R_7$ having the level of the difference (Re − Cl).

The arithmetic circuit 15 generates the third and fourth detecting signals Le and Cr in the manner similar to the sixth preferred embodiment, calculates the difference (Le − Cr) between respective levels of the third and fourth detecting signals Le and Cr and outputs the second comparative signal $L_7$ having the level of the difference (Le − Cr).

In order to improve the precision of calculating the aforementioned differences, a signal having the level of the difference (Re − Cr) may be outputted as the first comparative signal $R_7$, and a signal having the level of the difference (Le − Cl) may be outputted as the second comparative signal $L_7$.

(h) Other modifications

In the aforementioned preferred embodiments, the welding torch WT is oscillated in the right and left directions and is moved along the weld line $W_0$ based on a change in the welding current due to changes in the arc length and the wire extension. The control method for trace the weld line $W_0$ according to the preset invention is limited to the aforementioned preferred embodiments. For example, the welding torch WT is enabled to trace the weld line $W_0$ based on a change in an electric signal such as the average value of the welding current, a digital signal converted from the sampled welding current, a voltage or a current detected in an arc state or a short state of the short arc welding, a background voltage or a background current detected in a pulsed arc welding.

(5) Sampling action of the arc welding apparatus

The sampling action of the controller 3 shown in FIGS. 11 and 12a will be described below.

(a) Period upon sampling the position of the welding torch and the welding current A frequency Fs of a clock signal corresponding to a period upon sampling data of the position P of the oscillating welding torch WT and data of the welding current corresponding to respective positions P is set at a high frequency of 10 to 15 kHz in order to sample the data accurately so as to detect a minute change in the welding current in a short state of a short arc welding or for a time interval between a timing when a pulse current flows and a timing when a background current flows.

(b) Period upon correcting the center C of the oscillation

When a period Td upon correcting the center C of the oscillation becomes relatively short, the shift amount of the welding torch WT from the weld line $W_0$ can be controlled minutely, however, the period Td can not be set at a value smaller than the calculation time Tc for which the position of the center C of the oscillation is corrected in one operation. On the contrary, when the period Td becomes selectively long, the number of the data to be processed upon correcting the position of the center C of the oscillation in one operation can be increased since a longer calculation time for controlling the position of the center C of the oscillation can be set, resulting in that the reliability of the control operation can be improved.

When the welding torch WT moves in the direction of the weld line $W_0$ by a movement distance Ld for the period Td, the period Td is set so that the movement distance Ld becomes substantially constant and the period Td becomes longer than the calculation time Tc. Namely, the period Td is set at a maximum one of the ratio Ld/Vd or the calculation time Tc.

(c) Storage of the position of the welding torch and the welding current detecting signal The position detecting signal $S_{11}$ and the welding current detecting signal $S_{10}$ are stored in the ring buffer memories 18a and 20a of the main storage circuit 24, respectively, wherein the next address of the last address of each of the memories 18a and 20a is the top address, and the address thereof at which either the signal $S_{11}$ or $S_{10}$ is stored or read out is indicated by the ring buffer pointer.

(d) Flow chart of the sampling process

FIGS. 13a and 13b are flow charts showing the sampling process for sampling the detecting signals $S_{11}$ and $S_{10}$ and storing the sampled signals in the ring buffer memories 18a and 20a, respectively.

Referring to FIG. 13a, first of all, when the power is supplied to the arc welding apparatus, the sampling process is started, and then, the storage circuits 18 and 20 are initialized at steps #1 and #2, respectively. Thereafter, the process for controlling the position of the oscillating welding torch WT is started at step #3, a clock counter (not shown) for counting the clock signal used for sampling the detecting signal is reset, and the clock signal for sampling starts to be outputted at step #5. Then, it is judged whether or not the sampling action continues to be performed at step #6.

When the sampling process continues to be performed (Yes at step #6), the position of the oscillating welding torch WT is sampled at step #7, and the encoded signal outputted from an encoder of the position detecting circuit 11 is counted cumulatively by the cumulative counter 21 at step #8, and the counting value of the cumulative counter 21 is outputted as the detecting signal $S_{11}$ to the CPU 23 at step #9. Thereafter, a series of detecting signal $S_{11}$ shown in FIG. 14a which is input to the CPU 23 is stored at the address of the ring buffer memory 18a of the main storage circuit 24 indicated by a first ring buffer pointer at step #10.

On the other hand, after the welding current is sampled at step #11, the welding current detecting signal $S_{10}$ outputted from the welding current detecting circuit 10 is converted into a digital signal by the A/D converter 10d shown in FIG. 11 at step #12 and the converted digital signal is input to the CPU 23 at step #13, a series of welding current detecting signal $S_{10}$ shown in FIG. 15a which has been input to the CPU 23 is stored at the address of a second ring buffer memory 20a of the main storage circuit 24 indicated by the ring buffer pointer at step #14.

When a series of detecting signal $S_{11}$ has been stored in the ring buffer memory 18a and a series of welding current detecting signal $S_{10}$ has been stored in the ring buffer memory 20a, respective ring buffer pointers of the first and second ring buffer memories 18a and 20a are incremented at step #15, and the clock counter (not shown in FIGS. 12a and 11) is incremented by one. Then, the above sampling process at steps #6 to #16 is repeated until the counting value of the clock counter becomes a predetermined setting value M, wherein the setting value M is, for example, the product of the frequency Fs of the clock signal for sampling and the time period Td.

When the counting value of the clock counter becomes the setting value M (Yes at step #17), the clock counter is reset at step #18, and the instruction of start of the calculation is outputted at step #19. Then, the program flow goes to step #6, and the sampling process is repeated. On the other hand, after the instruction of start of the calculation is outputted at step #19, the action of the filters 12 and 19 is started.

When the sampling process does not continue to be performed (No at step #6), the clock signal for sampling stops to be outputted, and then, the process for controlling the position of the center C of the oscillation is completed.

(6) Action of the filters (a) Action of the filter 19

The action of the filter 19 will be described below with reference to FIGS. 16a to 16d.

Figure 16A:
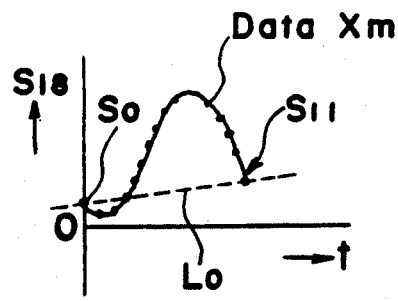
Figure 16B:
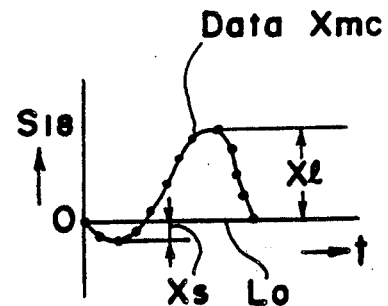

As shown in FIG. 16a, the first value $S_0$ of the data Xm read out from the buffer memory 18b and the latest value $S_{11}$ thereof are linked by a straight line $L_0$, and the data Xm are converted into data Xmc so that each value located on the straight line $L_0$ becomes zero, as shown in FIG. 16b.

Figure 16C:
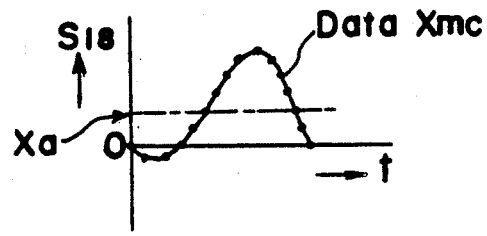
Figure 16D:
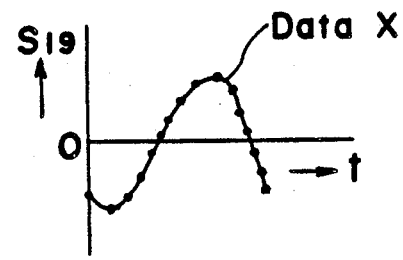

Thereafter, the converted data Xmc is further converted into the data X to be outputted to the waveform composing circuit 13 so that the average value Xa shown in FIG. 16c of the maximum value Xl of the data Xmc and the minimum value Xs thereof becomes zero corresponding to zero point of the oscillation, as shown in FIG. 16d.

(b) Action of the filter 12

Figure 17:
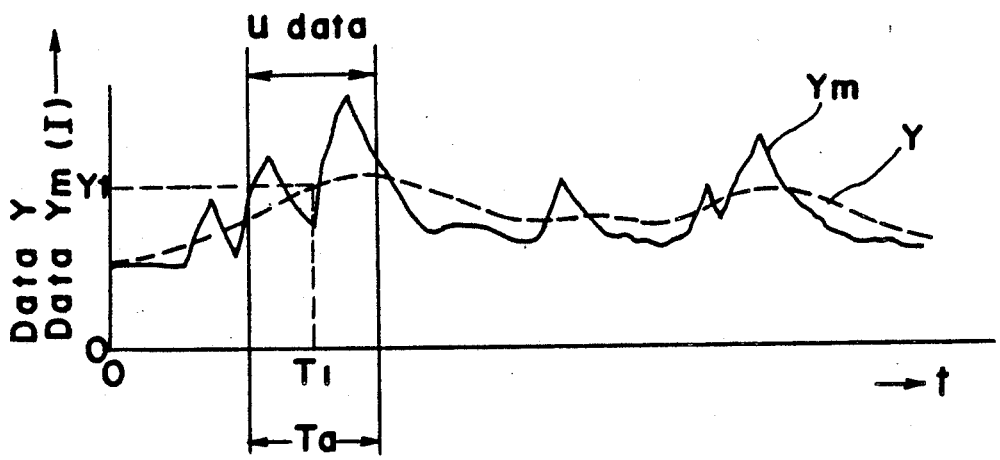

The real line of FIG. 17 shows a series of signal $S_{20}$ (the data Ym) outputted from the ring buffer memory 20a to a passed time t. As shown in FIG. 17, there is calculated the average value Yt of the number n of data Ym for a predetermined time interval Ta such as 10 to 50 msec. required for converting the data Ym into the data Y so that respective values of the data Y vary smoothly, wherein the number u of the data Ym exist for the time interval Ta is the product of the time interval Ta and the frequency Fs of the clock signal for sampling. The moving average value Yt is represented by the following equation:

$$Yt = \left( \sum_{i=t-\frac{u}{2}}^{t+\frac{u}{2}-1} Ym_i \right) / u$$

For example, the value of the data Ym at a timing $T_1$ corresponding to a middle timing for the time interval Ta is converted into the moving average value Yt.

(7) Calculation of the position correction signal

A series of signal $S_{19}$ (the data X) shown in FIG. 14c which is outputted from the filter 19 and a series of signal $S_{12}$ (the data Y) shown in FIG. 15c which is outputted from the filter 12 are input to the waveform composing circuit 13, and the waveform composing circuit 13 generates the waveform signal $S_{13}$ shown in FIG. 18. Furthermore, responsive to the waveform signal $S_{13}$, the arithmetic circuit 16 calculates the sum $\Sigma Rr$ of the data of the welding current (shown in FIG.

19b) detected when the welding torch WT moves in the right direction for the time interval of the right half of the amplitude of the oscillation, and calculates the sum $\Sigma Rl$ of the data of the welding current (shown in FIG. 19c) detected when the welding torch WT moves in the left direction for the time interval of the right half of the amplitude of the oscillation. Thereafter, the arithmetic circuit 16 calculates the difference $\Sigma Rr - \Sigma Rl$ and outputs the first comparative signal $R_8$ having the level of the difference $\Sigma Rr - \Sigma Rl$ (See FIG. 19a).

In FIGS. 19a to 19c and 20a to 20c, the axis of abscissa represents the signal $S_{19}$ outputted from the filter 19 corresponding to the position P of the oscillating welding torch WT, and the axis of ordinate represents the signal $S_{12}$ outputted from the filter 12 corresponding to the welding current I.

Responsive to the waveform signal $S_{13}$, the arithmetic circuit 15 calculates the sum $\Sigma Ll$ of the data of the welding current (shown in FIG. 20b) detected when the welding torch WT moves in the left direction for the time interval of the left half of the amplitude of the oscillation, and calculates the sum $\Sigma Lr$ of the data of the welding current (shown in FIG. 20c) detected when the welding torch WT moves in the right direction for the time interval of the left half of the amplitude of the oscillation. Furthermore, the arithmetic circuit 15 calculates the difference $\Sigma Ll - \Sigma Lr$ between the sums $\Sigma Ll$ and $\Sigma Lr$, and outputs the second comparative signal $L_8$ having the level of the difference $\Sigma Ll - \Sigma Lr$ (See FIG. 20a).

The arithmetic circuit 16 calculates the difference $R_8 - L_8$ between the first and second comparative signals $R_8$ and $L_8$, and outputs the signal J having the level of the difference $R_8 - L_8$. The arithmetic circuit 26 calculates a value of the function F(J) having a variable of the signal J, and outputs the signal Z corresponding to the value of the function F(J). For example, the function F(J) is represented by the following equation:

$$F(J) = a_0 J + b_0,$$

wherein $a_0$ and $b_0$ are predetermined constants, respectively.

For example, when the oscillation frequency is 5 [Hz], $a > 0$ since the locus of the waveform signal $S_{13}$ rotates in the aforementioned normal rotation direction in a form of a character of 8. On the other hand, when the oscillation frequency is 10 [Hz], $a < 0$ since the locus thereof rotates in the aforementioned reverse rotation direction in a waveform of a character of 8 which is rotated by right angle.

The welding operation is performed after the wire end Wa is shifted by a predetermined distance Zr from the weld line $W_0$ previously, and then, constitutional diagrams shown in FIGS. 21a and 21b are obtained depending upon a form of the groove and the position of the welding torch WT by calculating the aforementioned signal Jr. For example, as shown in FIG. 21a, since the signal Jr is approximately proportional to the shift amount Zr, the relationship between the signal Jr and the shift amount Zr is represented by the following equation.

$$Zr = a_0 Jr + b_0$$

After the values of $a_0$ and $b_0$ are calculated by the regression analysis, the shift amount Z by which the center C of the oscillation is to be shifted can be obtained based on the aforementioned signal J.

The position correction circuit 17 calculates the manipulated variable Q of the center C of the oscillation, responsive to the signal Z outputted from the arithmetic circuit 26. For example, in the PID control process, the manipulated variable $Q_i$ is represented by the following equation:

$$Q_i = kZ_i + l \sum_{j=0}^{i} Z_j + m(Z_i - Z_{i-1}),$$

wherein k, l and m are predetermined constants, respectively, and i is the number of times of the calculation upon controlling the position of the center C of the oscillation.

Responsive to the manipulated variable Q, the driver 25 generates the center position correcting signal $S_{17}$ corresponding to the manipulated variable Q and outputs it to the positional controller 8 so as to correct the position of the center C of the oscillation upon moving the welding torch WT along the weld line $W_0$.

(8) Effect of the preferred embodiments

The effect of the preset preferred embodiments will be described below.

(a) The welding torch WT is enabled to trace the weld line $W_0$ at an oscillation frequency higher than that of a conventional control process.

FIG. 22 is a graph showing the relationship between an oscillation frequency [Hz] represented by the axis of abscissa and a standard deviation [mms] of an error of a shift amount represented by the axis of ordinate when the shift amount by which the center C of the oscillation is shifted from the weld line $W_0$ is detected, wherein a dotted line of FIG. 22 shows the standard deviation thereof in the conventional control process, and a real line of FIG. 22 shows the standard deviation thereof in the control method of the preset preferred embodiments.

Referring to FIG. 22, in the conventional control process, the weld line $W_0$ can be detected only up to a middle oscillation frequency of about 5 Hz, namely, when the oscillation frequency is equal to or higher than 6 Hz, the welding operation can not be performed satisfactorily since the standard deviation thereof is extremely larger than 1 [mm]. On the other hand, in the control process of the present preferred embodiment, the standard deviation thereof is smaller than 1.0 [mm] at an oscillation frequency in the range from 2 to 6 Hz, and the standard deviation thereof decreases according to the oscillation frequency contrary to that of the present preferred embodiment when the oscillation frequency is higher than 6 Hz. When the oscillation frequency is 10 Hz, the standard deviation is 0.5 [mms], and particularly at a high oscillation frequency, the error of the shift amount becomes small.

In the conventional control process, when only a welding speed at which the welding torch WT is moved along the weld line $W_0$ is increased without heightening the oscillation frequency, the welding bead is formed thereon with meandering. In the conventional control process, the maximum welding speed upon moving the welding torch WT along the weld line $W_0$ is about 120 [cms/min.] in the case of a vertical down fillet welding, and the maximum welding speed is about 80 [cms/min.] in the case of a lap fillet welding. On the other hand, in the present preferred embodiments, a high oscillation frequency can be set so as to fall in the range from 7 to 10 Hz. Therefore, the maximum welding speed upon moving the welding torch WT along the weld line $W_0$ is about 200 [cms/min.] in the case of the vertical down fillet welding, and the maximum welding speed is about 150 [cms/min.] in the case of the lap fillet welding. Namely, when the welding speed is set at twice the welding speed set in the conventional control process, the oscillation frequency can be set at twice the oscillation frequency in the conventional control process, and the welding bead can be formed without meandering.

Furthermore, in the conventional control process, the welding speed can not be increased even when thin plates are welded since there is an upper limit in the maximum welding speed upon moving the welding torch WT along the weld line. Therefore, the minimum thickness of the plates which can be welded together is 2.0 [mms] in the case of the horizontal fillet welding, and the minimum thickness thereof is 3.2 [mms] in the case of the lap fillet welding. On the other hand, in the present preferred embodiments, the minimum thickness thereof is 1.2 [mms] in the case of the horizontal fillet welding, and the minimum thickness thereof is 2.3 [mms] in the case of the lap fillet welding.

(b) The precision of moving the welding torch along the weld line is improved.

An arc sensor used in the conventional control process can detect the shift amount by which the center C of the oscillation is shifted from the weld line $W_0$ based on the data of respective average values of the welding current detected for one period or half the period of the oscillation. However, when the oscillation frequency is heightened, a sampling number in which the welding current can be sampled for a unit time interval increases.

FIG. 23 is a graph showing the shift of a real weld line Ws inclined from a predetermined weld line corresponding to the axis of abscissa, wherein the axis of abscissa thereof represents a welding time [sec.] and the axis of ordinate represents the shift amount [mms] of the position of the real weld line inclined from the predetermined weld line. A dotted line of FIG. 23 shows characteristic of the shift amount [mms] of the center C of the oscillation from the inclined real weld line Ws to a passed time [sec.] at an oscillation frequency of 2.5 Hz in the conventional control process. As shown in the dotted line of FIG. 23, a maximum shift amount of 1.0 [mm] is caused. On the other hand, a real line of FIG. 23 shows characteristic of the shift amount [mms] of the center C of the oscillation from the inclined real weld line Ws to a passed time [sec.] at an oscillation frequency of 10 Hz in the present preferred embodiments. As shown in the real line of FIG. 23, a maximum shift amount is equal to smaller than 0.5 [mms], namely, it becomes equal to or smaller than half the maximum shift amount in the conventional control process and the precision of moving the welding torch WT along the weld line is improved.

(c) The position of the oscillating welding torch can be controlled so as to trace the weld line in the case of a vertical down welding.

In the vertical down welding, the melting metal drops under the arc and flows onto the surface of the groove unstably. Therefore, it is remarkably difficult to perform the vertical down welding using the conventional control process with the arc sensor. On the other hand, in the control process of the present preferred embodiments, a higher oscillation frequency can be set and a higher welding speed can be set than that in the conventional control process. Therefore, the welding torch WT or the arc can be moved at a welding speed higher than the speed at which the melting metal drops, resulting in that the welding torch WT can be controlled to be moved along the weld line $W_0$ more stably in the vertical down welding without the influence of dropping of the melting metal. For example, the vertical down fillet welding can be performed at a welding speed of 200 [cms/min.] and the lap vertical fillet welding is performed at a welding speed of 150 [cms/min.].

(d) The position of the oscillating welding torch can be controlled precisely so as to trace the weld line even in the case of a small welding current.

In the conventional control process with the arc sensor, when the welding current decreases, the error of detecting the welding current increases. However, in the control process of the present preferred embodiments, the error of detecting the welding current can be decreased as compared with that in the conventional control process by setting a high oscillation frequency. Therefore, the control process of the present preferred embodiments can be used even in the case of a welding current smaller than that in the conventional control process.

(e) The control process of the present preferred embodiments can be applied to various kinds of welding processes.

The conventional control process is performed under the condition that the arc length is kept approximately constant. Therefore, the conventional control process can not be used in common with welding processes having different inductances of the power source for welding. On the other hand, even though the arc length varies or the inductance of the power source for welding varies, the control process of the present preferred embodiments can be applied to various kinds of welding processes solely or commonly over the wide range of the welding condition such as a spray arc, a short arc, a pulse arc.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A control method in a welding apparatus for enabling a welding torch to trace a weld line while oscillating said welding torch in left and right directions solidly crossing said weld line by detecting a change in an electric signal responsive to changes in an arc length and a wire extension, comprising the steps of:

detecting said electric signal as a first detecting signal when said welding torch moves in the right direction for a first time interval of the right half of the amplitude of the oscillation;

detecting said electric signal as a second detecting signal when said welding torch moves in the left direction for the first time interval;

generating a first comparative signal by comparing the first detecting signal with the second detecting signal;

detecting said electric signal as a third detecting signal when said welding torch moves in the left direction for a second time interval of the left half of the amplitude of the oscillation;

detecting said electric signal as a fourth detecting signal when said welding torch moves in the right direction for the second time interval;

generating a second comparative signal by comparing the third detecting signal with the fourth detecting signal;

calculating a difference between respective levels of the first and second comparative signals; and moving the center of the oscillation in such a direction that the calculated difference becomes small so as to enable said welding torch to trace said weld line;

wherein the calculated difference used for determining the direction in which the center of the oscillation is to be moved is set so that the sight of the calculated difference at an oscillation frequency lower than a predetermined frequency is different from the sign of the calculated difference at the oscillation frequency equal to or higher than the predetermined frequency.

2. The control method as claimed in claim 1, wherein the first to fourth detecting signals have levels of integrated values of a welding current flowing between said welding torch and works to be welded, a ratio of the first detecting signal to the second detecting signal is calculated so as to generate the first comparative signal having the level of the calculated ratio, and a ratio of the third detecting signal to the fourth detecting signal is calculated so as to generate the second comparative signal having the level of the calculated ratio.

3. The control method as claimed in claim 1, wherein the first to fourth detecting signals have levels of integrated values of a welding current flowing between said welding torch and works to be welded, a difference between the first and second detecting signals is calculated so as to generate the first comparative signal having the level of the calculated difference, and a difference between the third and fourth detecting signals is calculated so as to generate the second comparative signal having the level of the calculated difference.

4. The control method as claimed in claim 1, wherein the first detecting signal has a level of a welding current flowing between said welding torch and works to be welded when said welding torch is located at a predetermined first position, the second detecting signal has a level of the welding current when said welding torch is located at the first position, the third detecting signal has a level of the welding current when said welding torch is located at a predetermined second position, the fourth detecting signal has a level of the welding current when said welding torch is located at the second position, a ratio of the first detecting signal to the second detecting signal is calculated so as to generate the first comparative signal having the level of the calculated ratio, and a ratio of the third detecting signal to the fourth detecting signal is calculated so as to generate the second comparative signal having the level of the calculated ratio.

5. The control method as claimed in claim 4, wherein the first position is a middle point of the right half of the amplitude of the oscillation, and the second position is a middle point of the left half thereof.

6. The control method as claimed in claim 1, wherein the first detecting signal has a level of a welding current flowing between said welding torch and works to be welded when said welding torch is located at a predetermined first position, the second detecting signal has a level of the welding current when said welding torch is located at the first position, the third detecting signal has a level of the welding current when said welding torch is located at a predetermined second position, the fourth detecting signal has a level of the welding current when said welding torch is located at the second position, a difference between the first and second detecting signals is calculated so as to generate the first comparative signal having the level of the calculated difference, and a difference between the third and fourth detecting signals is calculated so as to generate the second comparative signal having the level of the calculated difference.

7. The control method as claimed in claim 6, wherein the first position is a middle point of the right half of the amplitude of the oscillation, and the second position is a middle point of the left half thereof.

8. A control method in a welding apparatus for enabling a welding torch to trace a weld line while oscillating said welding torch in left and right directions solidly crossing said weld line by detecting a change in an electric signal responsive to changes in an arc length and a wire extension, comprising steps of:

detecting said electric signal as a first detecting signal when said welding torch is located at the right edge of the oscillation after said welding torch moves in the right direction;

detecting said electric signal as a second detecting signal when said welding torch is located at the center of the oscillation while said welding torch moves in the left direction;

generating a first comparative signal by comparing the first detecting signal with the second detecting signal;

detecting said electric signal as a third detecting signal when said welding torch is located at the left edge of the oscillation after said welding torch moves in the left direction;

detecting said electric signal as a fourth detecting signal when said welding torch is located at the center of the oscillation while said welding torch moves in the right direction;

generating a second comparative signal by comparing the third detecting signal with the fourth detecting signal;

calculating a difference between respective levels of the first and second comparative signals; and moving the center of the oscillation in such a direction that the calculated difference becomes small so as to enable said welding torch to trace said weld line.

9. The control method as claimed in claim 8, wherein the first to fourth detecting signals have levels of a welding current flowing between said welding torch and works to be welded, a ratio of the first detecting signal to the second detecting signal is calculated so as to generate the first comparative signal having the level of the calculated ratio, and a ratio of the third detecting signal to the fourth detecting signal is calculated so as to generate the second comparative signal having the level of the calculated ratio.

10. The control method as claimed in claim 8, wherein the first to fourth detecting signals have levels of a welding current flowing between said welding torch and works to be welded, and a generation method for generating the first and second comparative signal is switched over as follows:

when an oscillation frequency is lower than a predetermined frequency, a ratio of the first detecting signal to the second detecting signal is calculated so as to generate the first comparative signal having the level of the calculated ratio, and a ratio of the third detecting signal to the fourth detecting signal is calculated so as to generate the second comparative signal having the level of the calculated ratio, when the oscillation frequency is equal to or higher than the predetermined frequency, a ratio of the first detecting signal to the fourth detecting signal is calculated so as to generate the first comparative signal having the level of the calculated ratio, and a ratio of the third detecting signal to the second detecting signal is calculated so as to generate the second comparative signal having the level of the calculated ratio.

11. The control method as claimed in claim 8, wherein the first to fourth detecting signals have levels of a welding current flowing between said welding torch and works to be welded, a difference between the first detecting signal and the second detecting signal is calculated so as to generate the first comparative signal having the level of the calculated ratio, and a difference between the third detecting signal and the fourth detecting signal is calculated so as to generate the second comparative signal having the level of the calculated ratio.

12. The control method as claimed in claim 8, wherein the first to fourth detecting signals have levels of a welding current flowing between said welding torch and works to be welded, and a generation method for generating the first and second comparative signals is switched over as follows:

when an oscillation frequency is lower than a predetermined frequency, a difference between the first detecting signal and the second detecting signal is calculated so as to generate the first comparative signal having the level of the calculated ratio, and a difference between the third detecting signal and the fourth detecting signal is calculated so as to generate the second comparative signal having the level of the calculated ratio, when the oscillation frequency is equal to or higher than the predetermined frequency, a difference between the first detecting signal and the fourth detecting signal is calculated so as to generate the first comparative signal having the level of the calculated ratio, and a difference between the third detecting signal and the second detecting signal is calculated so as to generate the second comparative signal having the level of the calculated ratio.

* * * * *

UNITED STATES PATENT AND TRADEMARK OFFICE
CERTIFICATE OF CORRECTION

PATENT NO. : 4,990,743

DATED : February 5, 1991

INVENTOR(S) : Katsuya Kugai, et al

It is certified that error appears in the above-identified patent and that said Letters Patent is hereby corrected as shown below:

Column 2, line 49: "th" should read as --the--

Column 3, line 14: "$B_0=A$" should read as --$B_0 + A$--

Column 9, line 11: "circuit shown" should read as --circuit 13 shown--

Column 9, line 42: "FIG. 1" should read as --FIG. 17--

Column 10, line 11: "Transient" should read as --(1) Transient--

Column 14, line 47: "$R_3 167$" should read as --$R_3 \simeq 0$--

Column 15, line 51: "at a frequency" should read as --at a low oscillation frequency--

Column 20, line 6: "therefore" should read as --Therefore--

Column 20, line 9: "$R_7 L_7$" should read as --$R_7 - L_7$--

Column 20, line 22: "$R_7 L_7$" should read as --$R_7 - L_7$--

UNITED STATES PATENT AND TRADEMARK OFFICE
CERTIFICATE OF CORRECTION

PATENT NO. : 4,990,743

DATED : February 5, 1991

INVENTOR(S) : Katsuya Kugai et al

It is certified that error appears in the above-identified patent and that said Letters Patent is hereby corrected as shown below:

Column 26, line 38: "20ato" should read as --20a to--

Column 31, line 22, Claim 1: "sight" should read as --sign--

Signed and Sealed this

Twenty-second Day of September, 1992

Attest:

DOUGLAS B. COMER

*Attesting Officer*      *Acting Commissioner of Patents and Trademarks*